(12) United States Patent
Kuang

(10) Patent No.: US 12,409,877 B1
(45) Date of Patent: Sep. 9, 2025

(54) FOLDING STROLLER

(71) Applicant: Junjie Kuang, Linwu County (CN)

(72) Inventor: Junjie Kuang, Linwu County (CN)

(73) Assignee: ZHONGSHAN KANGDI BABY PRODUCTS CO., LTD., Zhongshan (CN)

( * ) Notice: Subject to any disclaimer, the term of this patent is extended or adjusted under 35 U.S.C. 154(b) by 0 days.

(21) Appl. No.: 19/010,214

(22) Filed: Jan. 6, 2025

Related U.S. Application Data

(63) Continuation-in-part of application No. 18/808,117, filed on Aug. 19, 2024.

(51) Int. Cl.
  *B62B 7/08* (2006.01)
  *B62B 9/14* (2006.01)
  *B62B 9/20* (2006.01)

(52) U.S. Cl.
  CPC .............. *B62B 7/08* (2013.01); *B62B 9/142* (2013.01); *B62B 9/20* (2013.01)

(58) Field of Classification Search
  CPC ............. B62B 7/08; B62B 9/142; B62B 9/20
  See application file for complete search history.

(56) References Cited

U.S. PATENT DOCUMENTS

| | | | | |
|---|---|---|---|---|
| 4,706,986 A | * | 11/1987 | Kassai | B62B 7/08 |
| | | | | 108/177 |
| 4,746,140 A | * | 5/1988 | Kassai | B62B 7/08 |
| | | | | 108/177 |
| 8,388,015 B2 | * | 3/2013 | Chen | B62B 3/02 |
| | | | | 280/642 |
| 10,414,422 B2 | * | 9/2019 | Choi | B62B 9/082 |
| 10,583,852 B2 | * | 3/2020 | Fitzwater | B62B 7/008 |
| 10,668,939 B2 | * | 6/2020 | Yabuuchi | B62B 5/04 |
| 10,988,153 B1 | * | 4/2021 | Horowitz | B62B 7/008 |
| 11,465,665 B2 | * | 10/2022 | Sturgeon | B62B 7/062 |
| 11,608,098 B1 | * | 3/2023 | Horowitz | B62B 3/004 |
| 2010/0156069 A1 | * | 6/2010 | Chen | B62B 9/142 |
| | | | | 280/639 |
| 2023/0117703 A1 | * | 4/2023 | Sturgeon | B62B 3/025 |
| | | | | 280/651 |

* cited by examiner

*Primary Examiner* — Bryan A Evans

(57) ABSTRACT

A folding stroller includes a framework and wheels mounted at a bottom of the framework. The framework has a folded state and an unfolded state. The frame includes front and rear bracket assemblies, a lower bracket assembly, and a support frame assembly. Front and rear connecting rod units are respectively arranged at lower ends of the front and rear bracket assemblies. The lower bracket assembly includes first and second lower bracket units. First ends of the first and second lower bracket units are respectively rotatably connected to a lower end of the front bracket assembly and a lower end of the rear bracket assembly. Second ends of the first and second lower bracket units are rotatably connected. The support frame assembly includes first and second support frame units and first and second rotating rod units.

18 Claims, 22 Drawing Sheets

FOLDING STROLLER

CROSS-REFERENCE TO RELATED APPLICATIONS

This application is a Continuation-in-Part of the U.S. application Ser. No. 18/808,117 filed on Aug. 19, 2024, and entitled "FOLDING STROLLER" now pending, the entire disclosures of which are incorporated herein by reference.

TECHNICAL FIELD

The present disclosure relates to the technical field of baby products, and in particular, to a folding stroller.

BACKGROUND OF THE INVENTION

With the development of the society and the improvement of the living standard, outdoor recreations have become a popular way for sports and leisure. More and more parents or legal guardians prefer to accompany babies and young children to play outdoors at their leisure time. As a children's product suitable for outdoor use, a stroller not only allows a baby to sit and lie in, making it convenient to take the baby to play around, but also allows for placement of some outdoor products, so that the stroller is used as a convenient and labor-saving tool for transportation.

In the prior art, there are many rods in a stroller, so that a folding component is complex, and a folding operation is cumbersome. Moreover, it is also easy to pinch the fingers of a user during folding of the stroller. Meanwhile, this type of folding stroller product still has a large volume after being folded, making it inconvenient to carry. Furthermore, the stroller is not stable in a folded state and easily deforms. In addition, an accommodating space formed in the existing folding stroller product is approximately rectangular. When a baby sits or lies in the accommodating space, the legs need to bend or curl up. The comfort level is low.

For this purpose, the present disclosure provides a folding stroller, which can effectively solve the above problems. The folding stroller has a simple structure, and a folded product has a small volume and is stable. In addition, a leg accommodating space is provided, making it convenient to place the feet of a baby. The comfort level is high.

SUMMARY OF THE INVENTION

The present disclosure provides a folding stroller. The folding stroller has a simple structure, and a folded product has a small volume and is stable. In addition, a leg accommodating space is provided, making it convenient to place the feet of a baby. The comfort level is high.

The technical solution adopted by the present invention to solve the technical problem is as follows.

A folding stroller includes a framework and wheels mounted at a bottom of the framework. The framework has a folded state and an unfolded state. The framework includes a front bracket assembly, a rear bracket assembly, a lower bracket assembly and a support frame assembly.

The rear bracket assembly is arranged in a manner of being opposite to the front bracket assembly.

The lower bracket assembly includes a first lower bracket unit and a second lower bracket unit; a first end of the first lower bracket unit is rotationally connected to a lower end of the front bracket assembly; a first end of the second lower bracket unit is rotationally connected to a lower end of the rear bracket assembly; a second end of the first lower bracket unit is rotationally connected to a second end of the second lower bracket unit.

The support frame assembly is connected to the lower bracket assembly; the support frame assembly includes several support rod and frame units; the support rod and frame units are rotationally connected to at least one adjacent support rod and frame unit; when the framework is in the unfolded state, a downwards sunken foot accommodating space is formed among at least some of the support rod and frame units, the first lower bracket unit, and the second lower bracket unit.

As an improvement of the present invention, the support rod and frame units include a first support frame unit, a second support frame unit, a first rotating rod unit, and a second rotating rod unit; a first end of the first support frame unit is rotationally connected to a lower end of the front connecting rod unit; a first end of the second support frame unit is rotationally connected to a lower end of the rear connecting rod unit; a second end of the first support frame unit is rotationally connected to the second end of the second support frame unit; two ends of the first rotating rod unit are respectively rotationally connected to the first lower bracket unit and the first support frame unit; and two ends of the second rotating rod unit are respectively rotationally connected to the second lower bracket unit and the second support frame unit.

As an improvement of the present invention, the downwards sunken foot accommodating space is formed among the first rotating rod unit, the second rotating rod unit, a portion of the first lower bracket unit, a portion of the second lower bracket unit, a portion of the first support frame unit, and a portion of the second support frame unit.

As an improvement of the present invention, the support rod and frame units include two third support frame units; first ends of the two third support frame units are respectively rotationally connected to the first lower bracket unit and the second lower bracket unit; second ends of the two third support frame units are rotationally connected; and the downwards sunken foot accommodating space is formed among a portion of the first lower bracket unit, a portion of the second lower bracket unit, and the two third support frame units.

As an improvement of the present invention, the support rod and frame units include two fourth support frame units and a middle connecting rod unit; first ends of the two fourth support frame units are respectively rotationally connected to the first lower bracket unit and the second lower bracket unit; second ends of the two fourth support frame units are respectively rotationally connected to the middle connecting rod unit; and the downwards sunken foot accommodating space is formed among a portion of the first lower bracket unit, a portion of the second lower bracket unit, the middle connecting rod unit, and the two fourth support frame units.

As an improvement of the present invention, the first lower bracket unit includes a first limiting member arranged at the second end; the second end of the second lower bracket unit is rotatably connected to the first limiting member; and when the framework is in the unfolded state, the first limiting member resists against the second lower bracket unit.

As an improvement of the present invention, a first locking member is arranged in the second end of the second lower bracket unit; a locking end of the first locking member is threaded out of a side wall of the second end of the second lower bracket unit; the first limiting member is provided with a first locking hole; and when the framework is in the unfolded state, the locking end of the first locking member is inserted into the first locking hole.

As an improvement of the present invention, the first limiting member is provided with an unlocking button; a press end of the unlocking button is arranged towards the first locking hole; and under the driving of an external force, the press end of the unlocking button is moved towards the first locking hole to drive the locking end of the first locking member to be detached from the first locking hole.

As an improvement of the present invention, a second limiting member is arranged at a second end of the second support frame unit; and when the framework is in the unfolded state, the second limiting member resists against the first support frame unit.

As an improvement of the present invention, the framework further includes a fixing member; a first end of the fixing member is connected to the rear bracket assembly; a second end of the fixing member is detachably connected to the front bracket assembly; when the framework is in the folded state, the second end of the fixing member is connected to the front bracket assembly; and when the framework is in the unfolded state, the second end of the fixing member is detached from the front bracket assembly.

As an improvement of the present invention, the framework further includes a push rod assembly and a lock fastener; the push rod assembly is rotatably connected to the rear bracket assembly; the lock fastener is connected to the push rod assembly and the rear bracket assembly; and the lock fastener is configured to allow or hinder relative rotation between the push rod assembly and the rear bracket assembly.

As an improvement of the present invention, the wheels include movable casters and fixed casters; the movable casters are connected to a bottom of the front bracket assembly; and the fixed casters are connected to a bottom of the rear bracket assembly. The framework further includes a second locking assembly. The second locking assembly is moved between a locked position and an unlocked position. Several second locking holes are provided on inner sides of the fixed casters along edges of rotating shafts. When the second locking assembly is moved to the locked position, a locking rod of the second locking assembly is inserted into the second locking holes. When the second locking assembly is moved to the unlocked position, the locking rod of the second locking assembly is detached from the second locking holes.

As an improvement of the present invention, the second locking assembly further includes a driving pedal and a driving rod; the driving pedal is connected to the driving rod; a driving slope is arranged at an end portion of the driving rod; the driving pedal and the driving rod rotate around a rotating shaft of the driving rod under the action of an external force; and a first end of the locking rod resists against the driving slope and slides along a surface of the driving slope to allow the locking rod to extend and retract and to be inserted or detached from the second locking holes.

As an improvement of the present invention, the second locking assembly further includes a reset spring; one end of the reset spring is connected to a connecting portion at the bottom of the framework, and the other end of the reset spring is connected to the locking rod; and an elastic force of the reset spring enables the locking rod to have a tendency to move away from the second locking holes.

As an improvement of the present invention, the folding stroller further includes a cover body, a first connector is arranged at an upper end of each of the front bracket assembly and the rear bracket assembly; an upper end of the cover body is connected to the first connectors; and a lower end of the cover body is connected to a lower end of the front bracket assembly and a lower end of the rear bracket assembly or the lower bracket assembly.

As an improvement of the present invention, a connecting strap is arranged at the upper end of the cover body; through holes are provided on the first connectors; and a free end of the connecting strap passes through the through holes and are connected to a surface of the cover body.

As an improvement of the present invention, the folding stroller further includes a sunshade assembly, the sunshade assembly includes a second connector; and the second connector is detachably connected to the first connectors to connect or detach the sunshade assembly to or from the framework.

As an improvement of the present invention, one of the first connector and the second connector is provided with an insertion block, and the other one of the first connector and the second connector is provided with an insertion slot; and the insertion block is inserted into the insertion slot.

As an improvement of the present invention, the framework further includes an eccentric locking piece; the sunshade assembly is provided with a mounting column and a sunshade body connected to the mounting column; the first connector is provided with an insertion hole and an opening communicated to the insertion hole; the mounting column is inserted into the insertion hole; the eccentric locking piece is connected to the first connector and is rotated between a locking position and an unlocking position; and when the eccentric locking piece is rotated to the locking position, an eccentric portion of the eccentric locking piece passes through the opening and resists against a surface of the mounting column.

As an improvement of the present invention, the framework further includes an upper bracket assembly; the upper bracket assembly includes a first upper bracket unit, a second upper bracket unit, and two connecting bracket units; a first end of the first upper bracket unit and a first end of the second upper bracket unit are respectively rotationally connected to the two connecting bracket units; the two connecting bracket units are connected to the mounting column; and a second end of the first upper bracket unit is rotationally connected to a second end of the second upper bracket unit.

Beneficial effects: By the arrangement of the above structure, during use, the front bracket assembly and the rear bracket assembly are respectively pulled in a front direction and a rear direction and separated from each other until the first lower bracket unit and the second lower bracket unit are flushed with each other and in the same plane, and the support frame assembly is in a stretched state. In this case, the framework is in an unfolded state, making it convenient for a user to sit and lie down. The support frame assembly can provide an additional support force to hinder relative rotation of the first lower bracket unit and the second lower bracket unit, so that the structure of the product is stable. Moreover, the downwards sunken foot accommodating space is formed among some of the support rod and frame units, the first lower bracket unit, and the second lower bracket unit. A baby can sit in the stroller and place the feet in the downwards sunken foot accommodating space, so that the baby feels more comfortable when sitting in this product, and a user experience is enhanced. For storage, a middle portion of the lower bracket assembly and a middle portion of the support frame assembly are moved upwards. The first lower bracket unit and the second lower bracket unit rotate relative to each other. The first lower bracket unit rotates relative to the front bracket assembly; the second lower bracket unit rotates relative to the front bracket assembly; and the support frame assembly rotates relative to the lower bracket assembly, the front bracket assembly, and the rear bracket assembly. The support frame assembly collapses itself, and the front bracket assembly and the rear bracket assembly approach each other. The overall volume of the product is small, which is convenient for storage and transportation.

BRIEF DESCRIPTION OF DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Embodiment I

Figure 1:
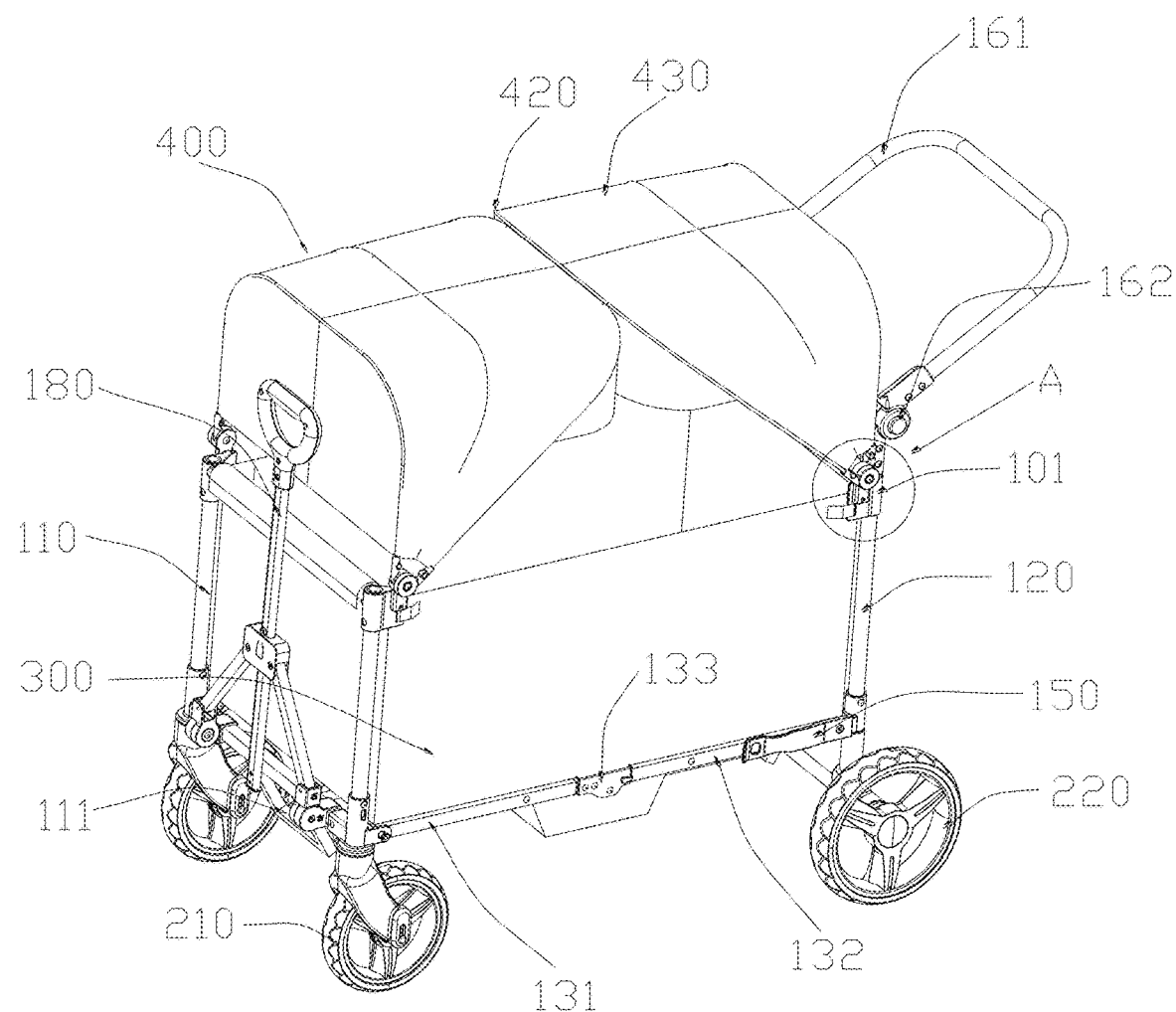
FIG. 1 is a schematic structural diagram of a push state according to Embodiment I of the present disclosure.
Figure 2:
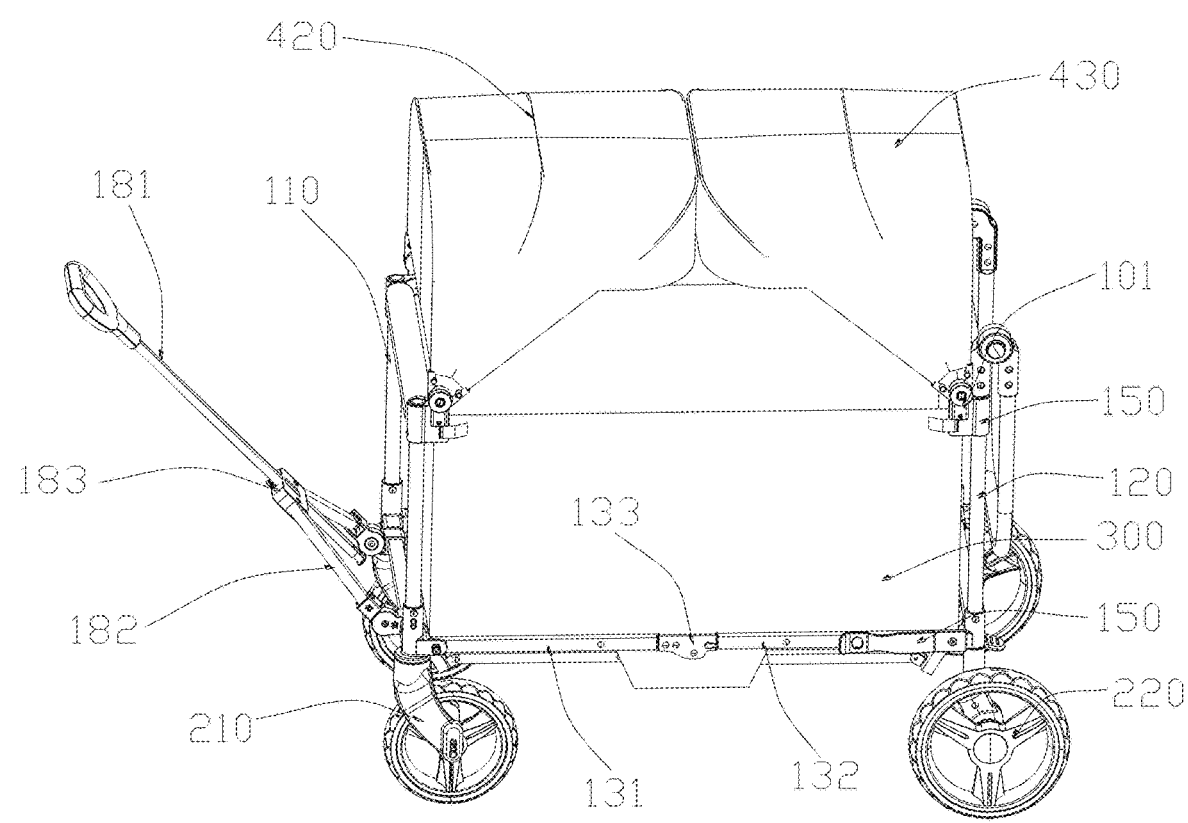
FIG. 2 is a schematic structural diagram of a pull state according to Embodiment I of the present disclosure.
Figure 3:
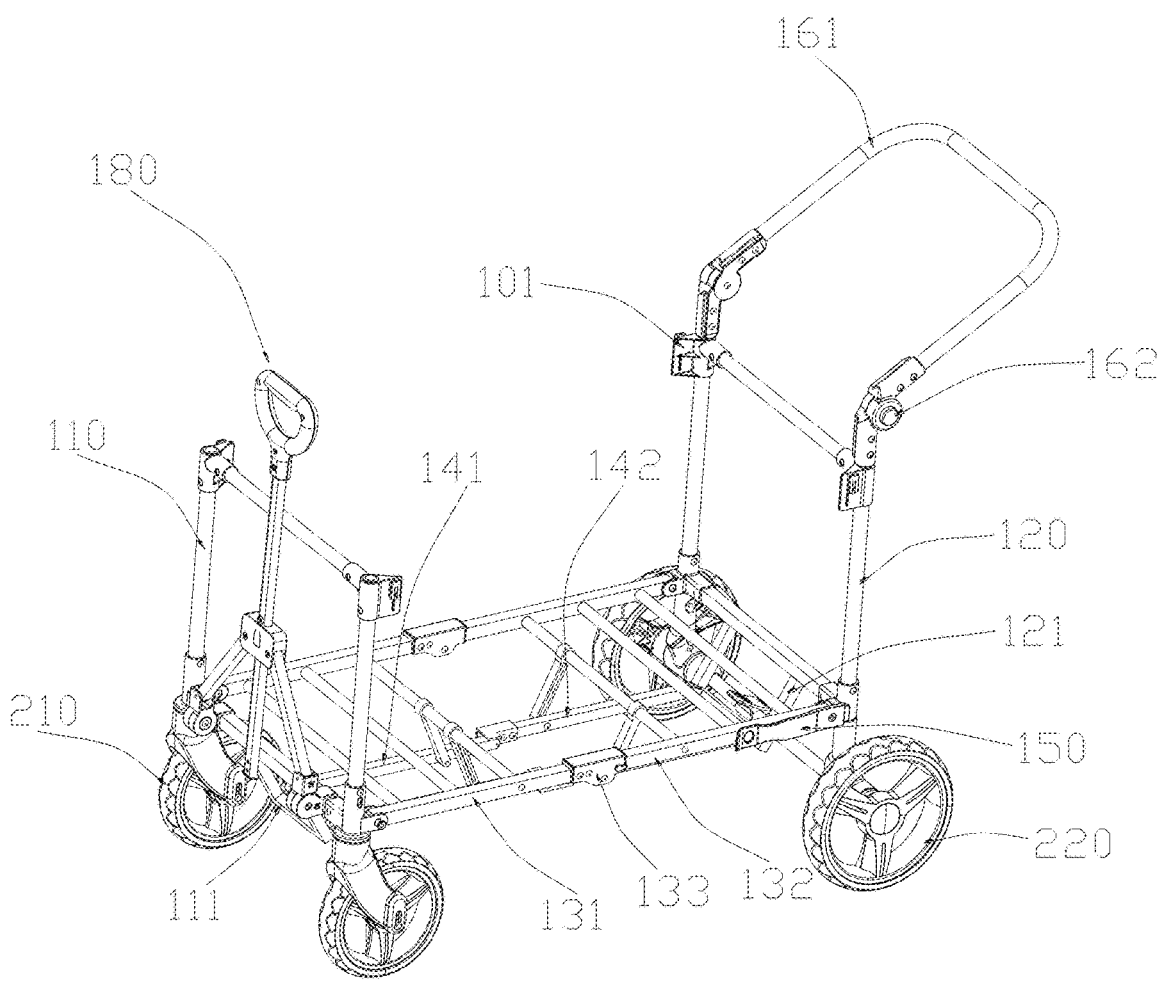
FIG. 3 is a schematic structural diagram of an unfolded state of a framework in an angle according to Embodiment I of the present disclosure.
Figure 4:
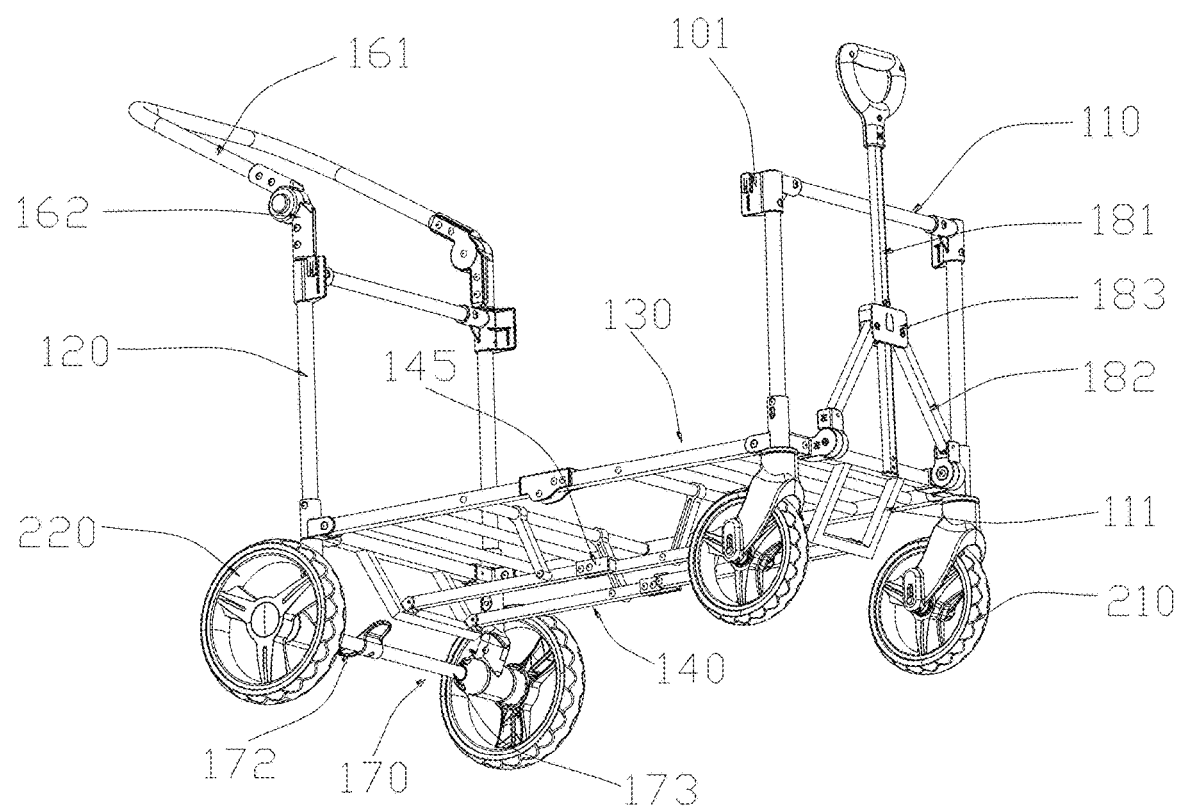
FIG. 4 is a schematic structural diagram of an unfolded state of a framework in another angle according to Embodiment I of the present disclosure.
Figure 5:
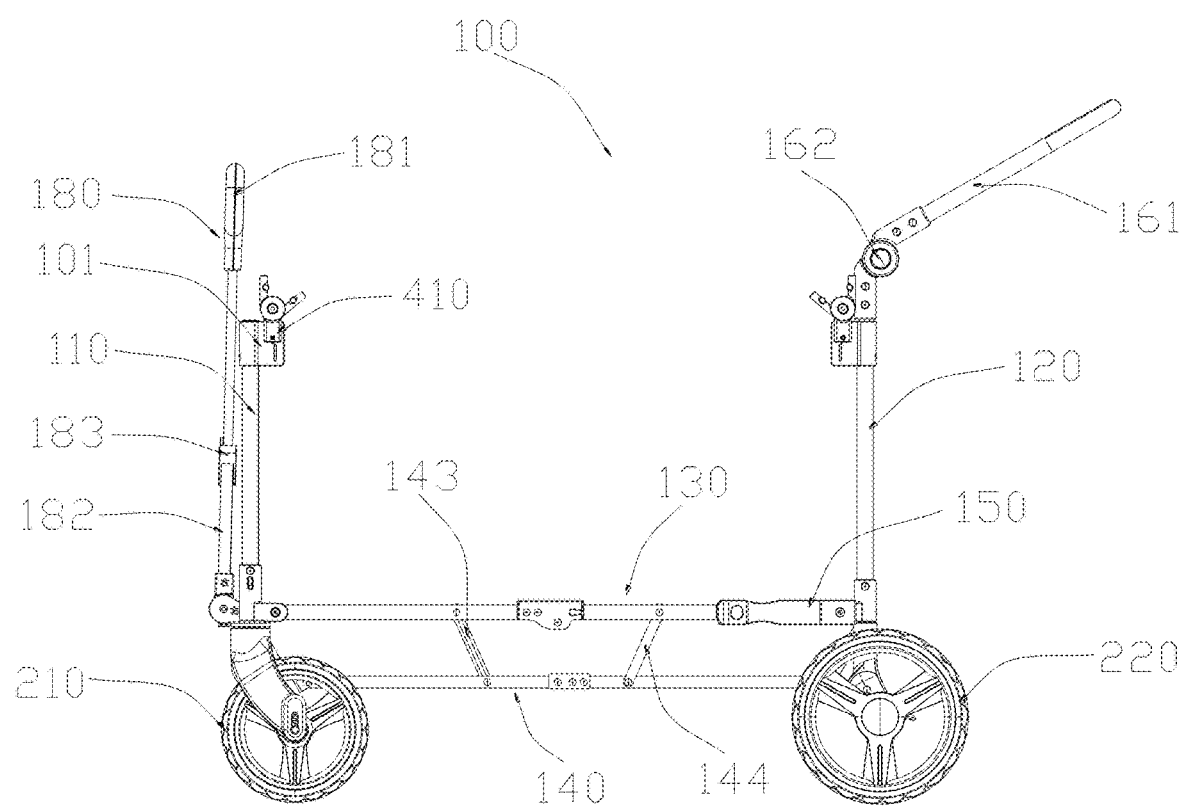
FIG. 5 is a side view of an unfolded state of a framework according to Embodiment I of the present disclosure.
Figure 6:
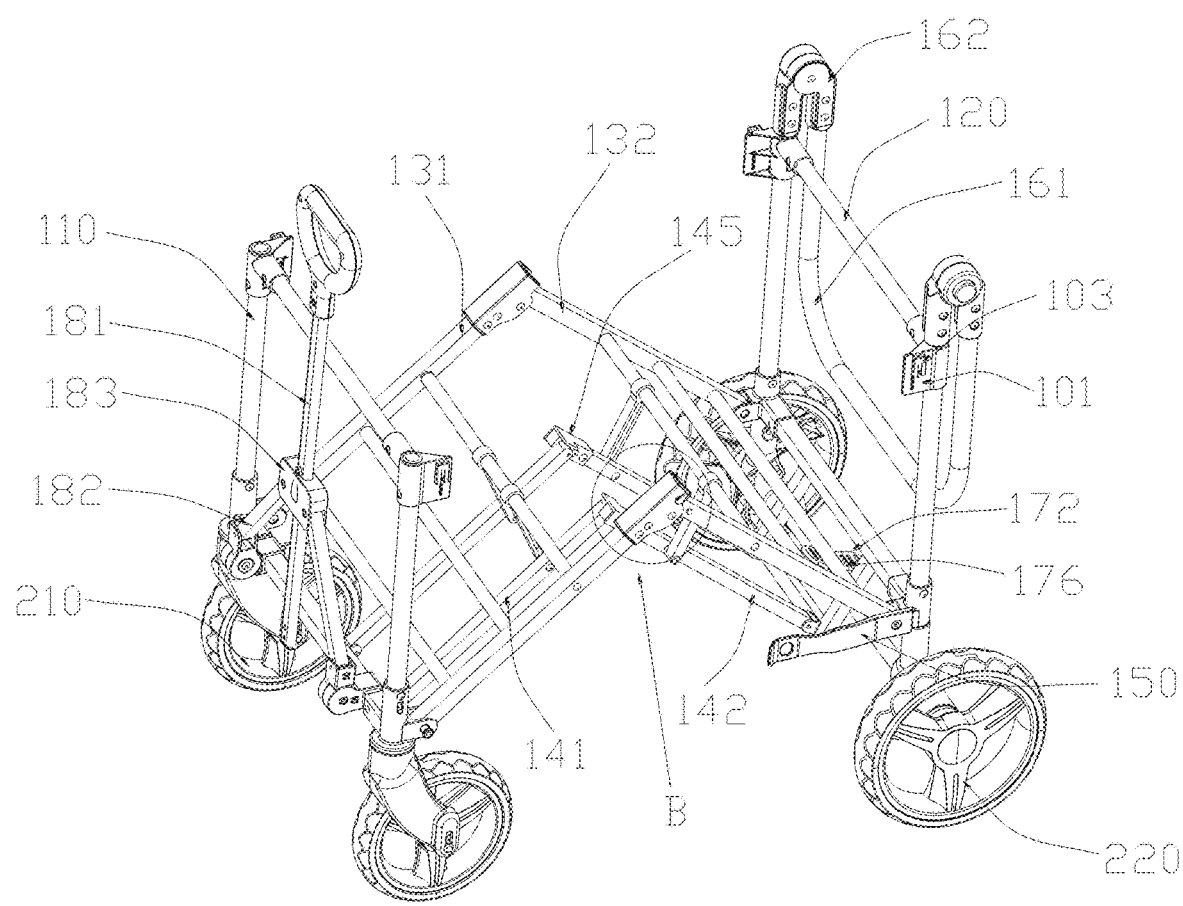
FIG. 6 is a schematic structural diagram of a semi-folded state of a framework according to Embodiment I of the present disclosure.
Figure 7:
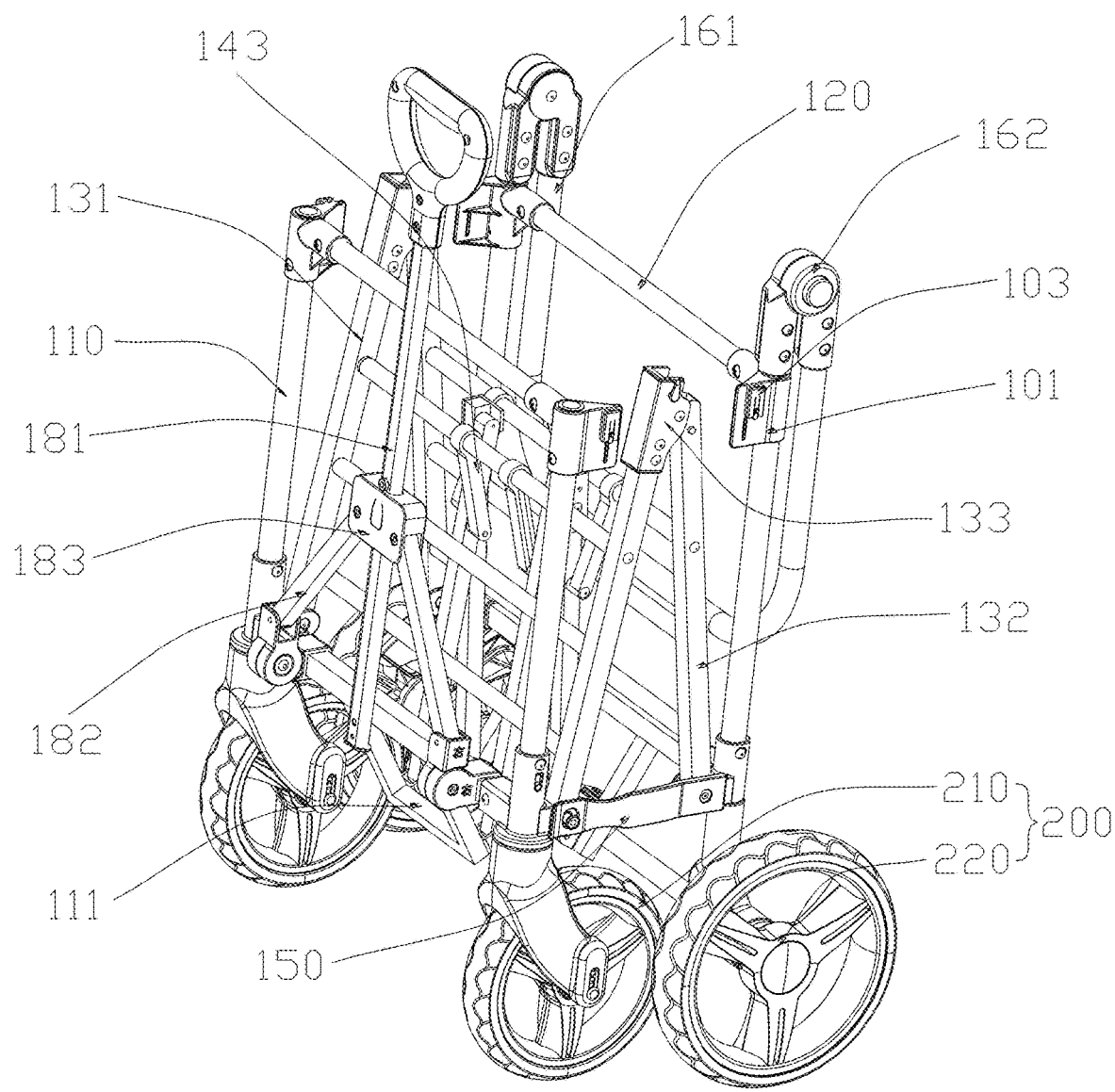
FIG. 7 is a schematic structural diagram of a folded state of a framework according to Embodiment I of the present disclosure.
Figure 8:
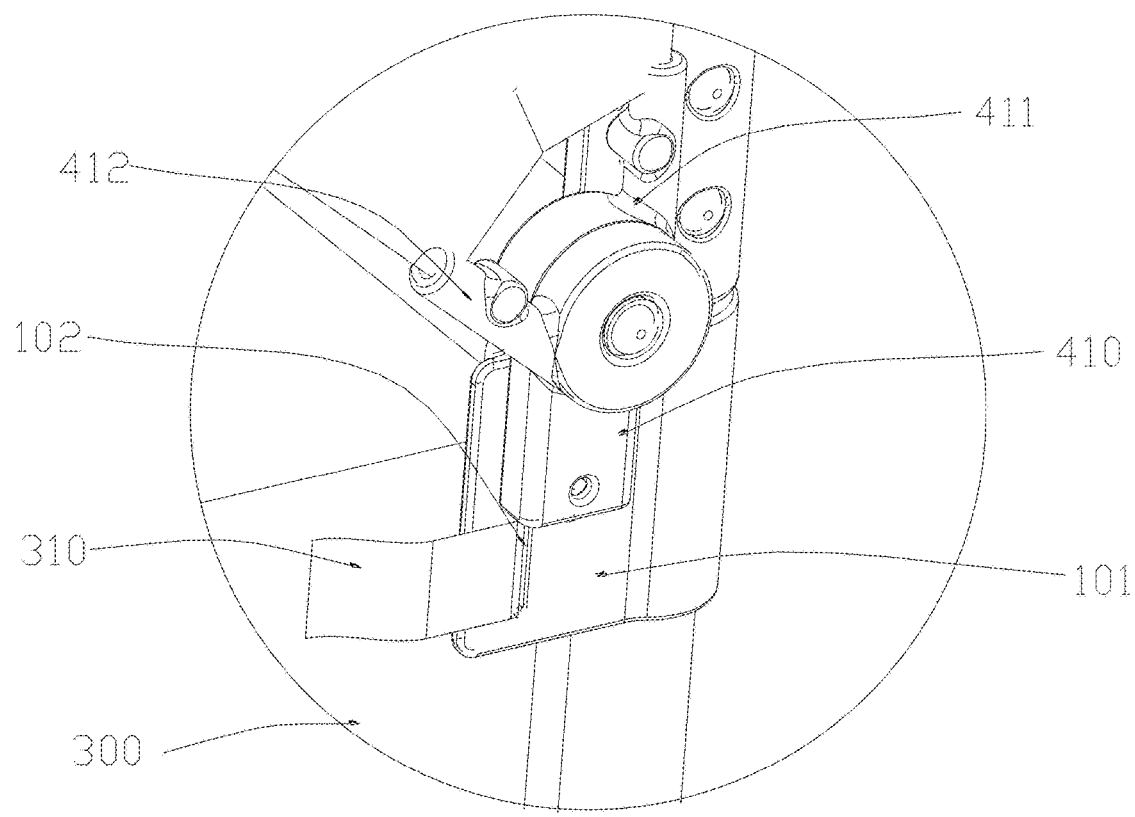
FIG. 8 is an enlarged view of circle A in FIG. 1.
Figure 9:
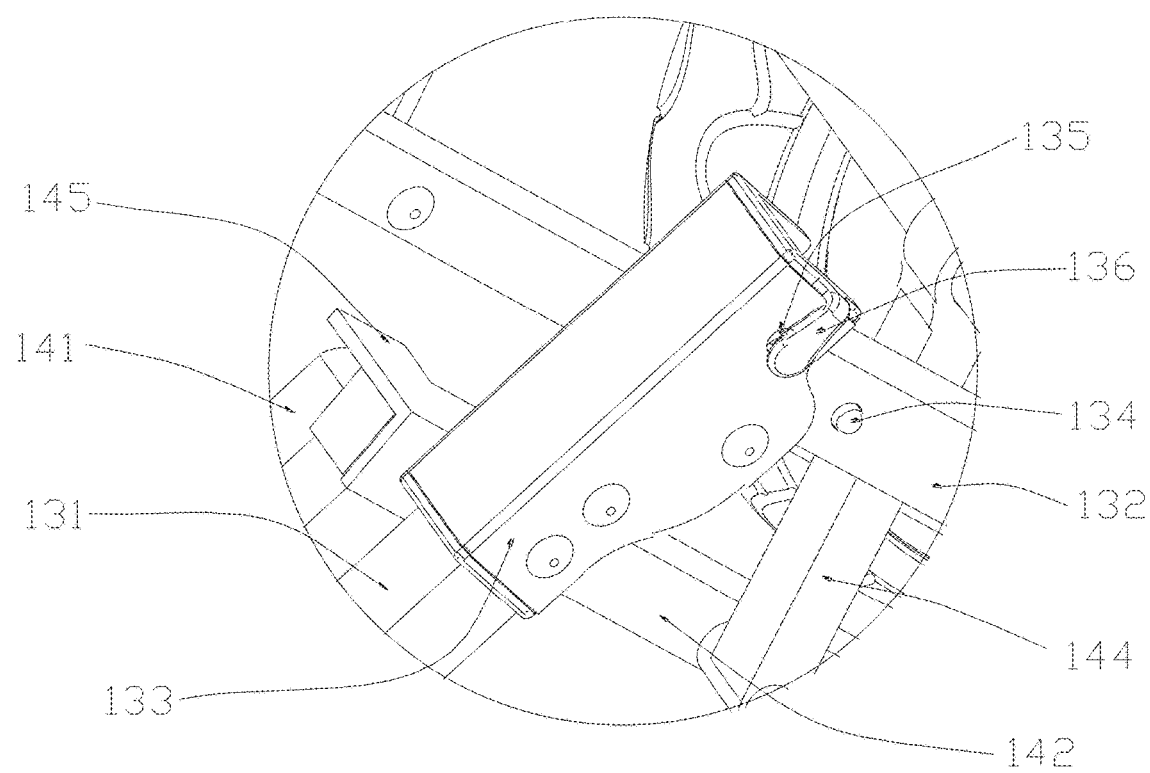
FIG. 9 is an enlarged view of circle B in FIG. 6.
Figure 10:
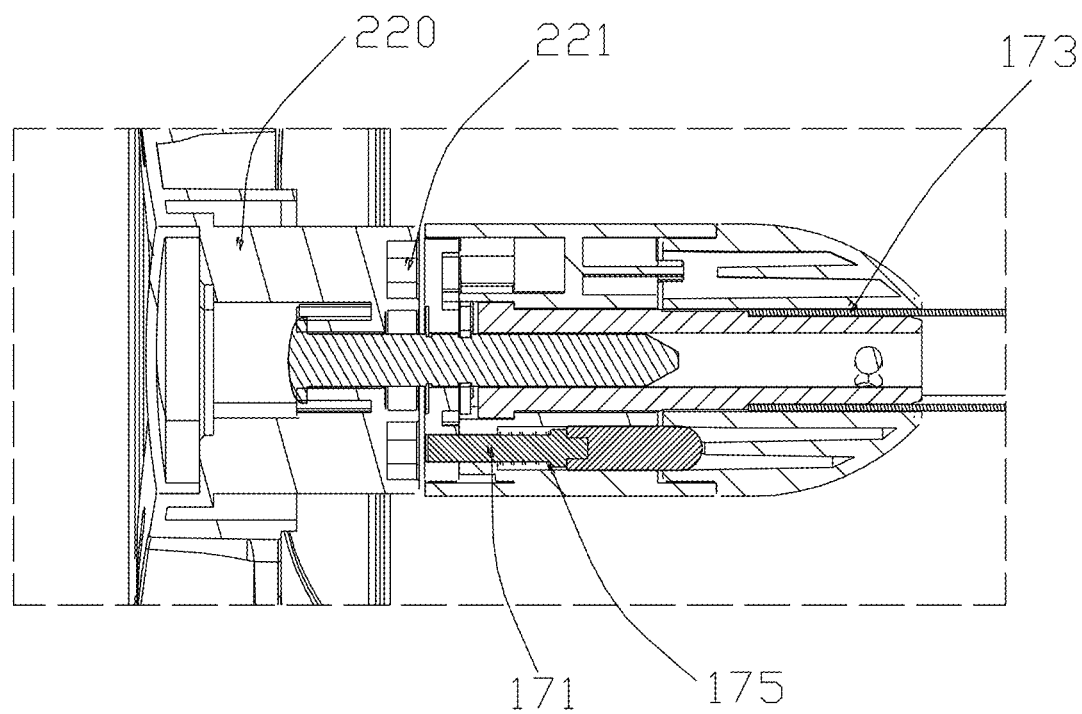
FIG. 10 is a sectional view of a second locking assembly at an unlocked position according to Embodiment I of the present disclosure.
Figure 11:
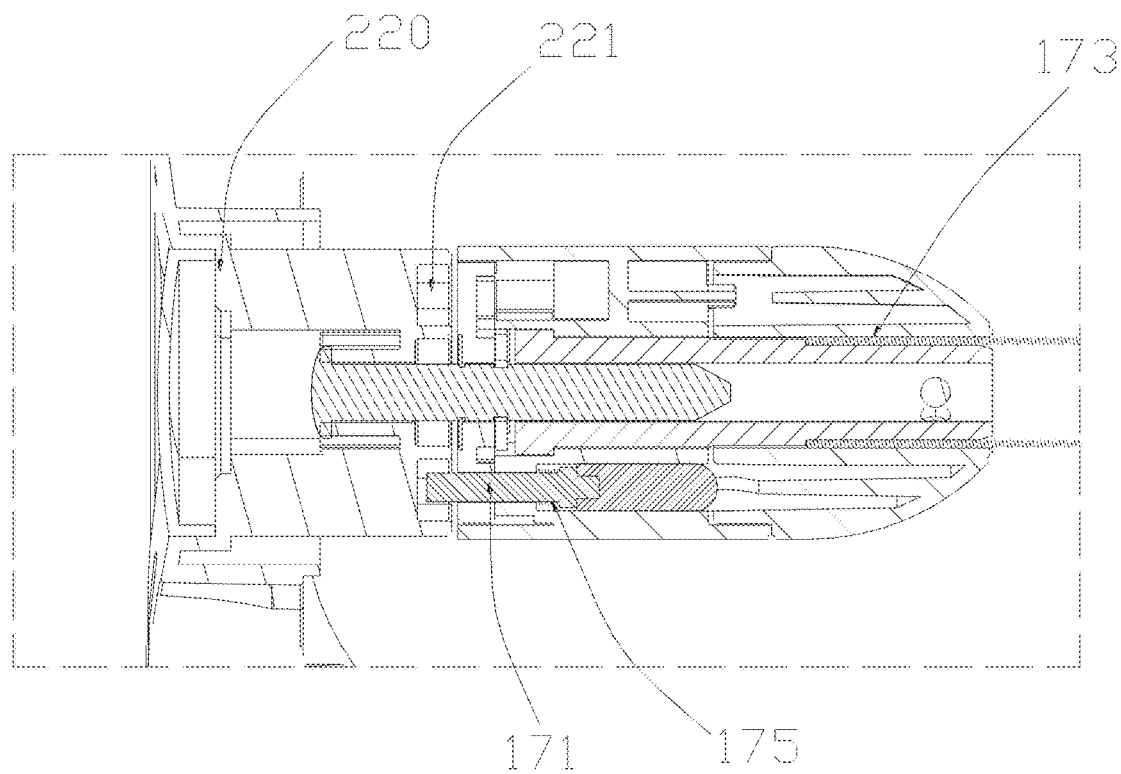
FIG. 11 is a sectional view of a second locking assembly at a locked position according to Embodiment I of the present disclosure.
Figure 12:
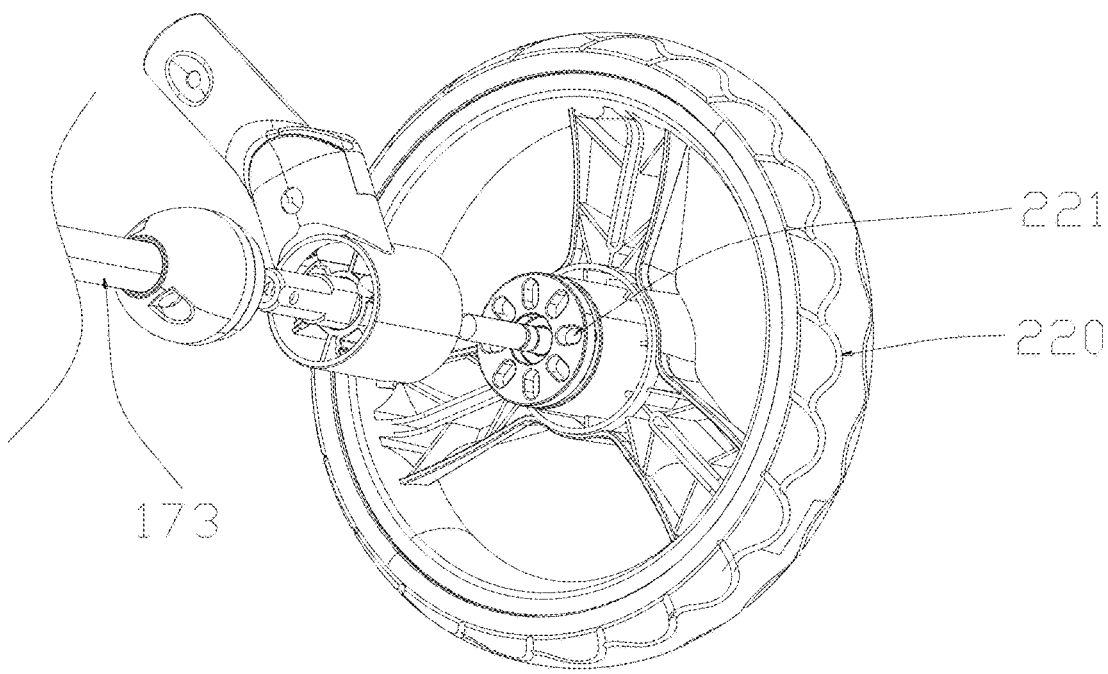
FIG. 12 is a partially structural exploded diagram of a second locking assembly in an angle according to Embodiment I of the present disclosure.
Figure 13:
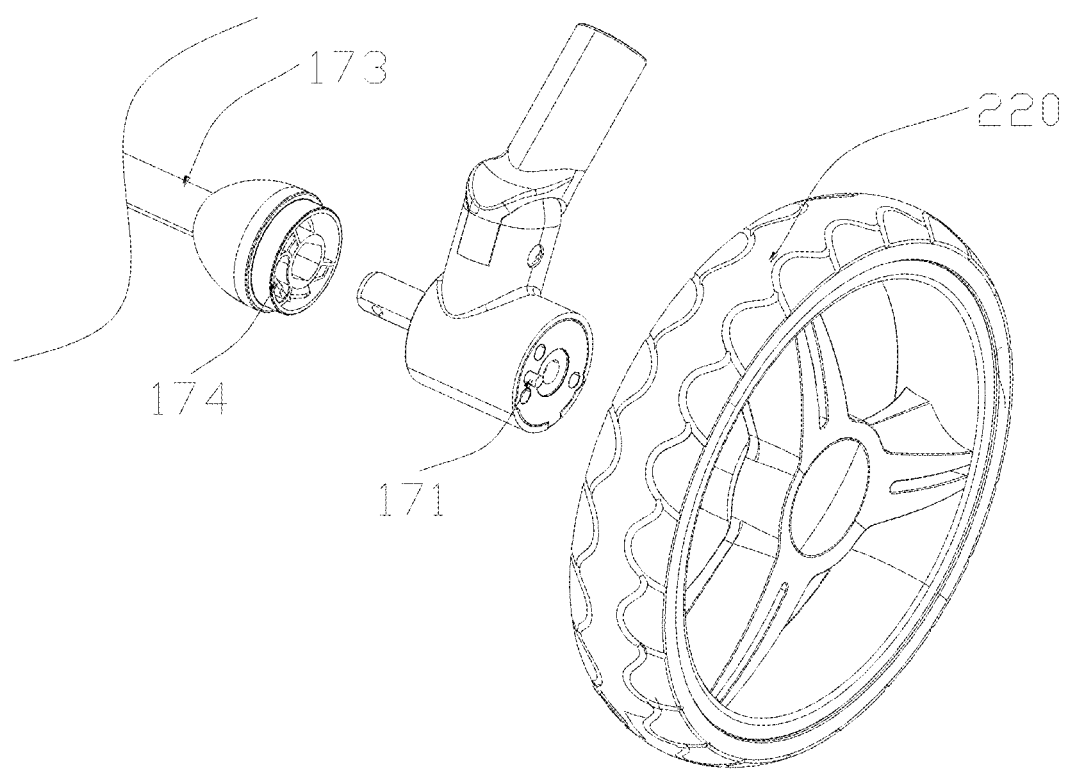
FIG. 13 is a partially structural exploded diagram of a second locking assembly in another angle according to Embodiment I of the present disclosure.
Figure 14:
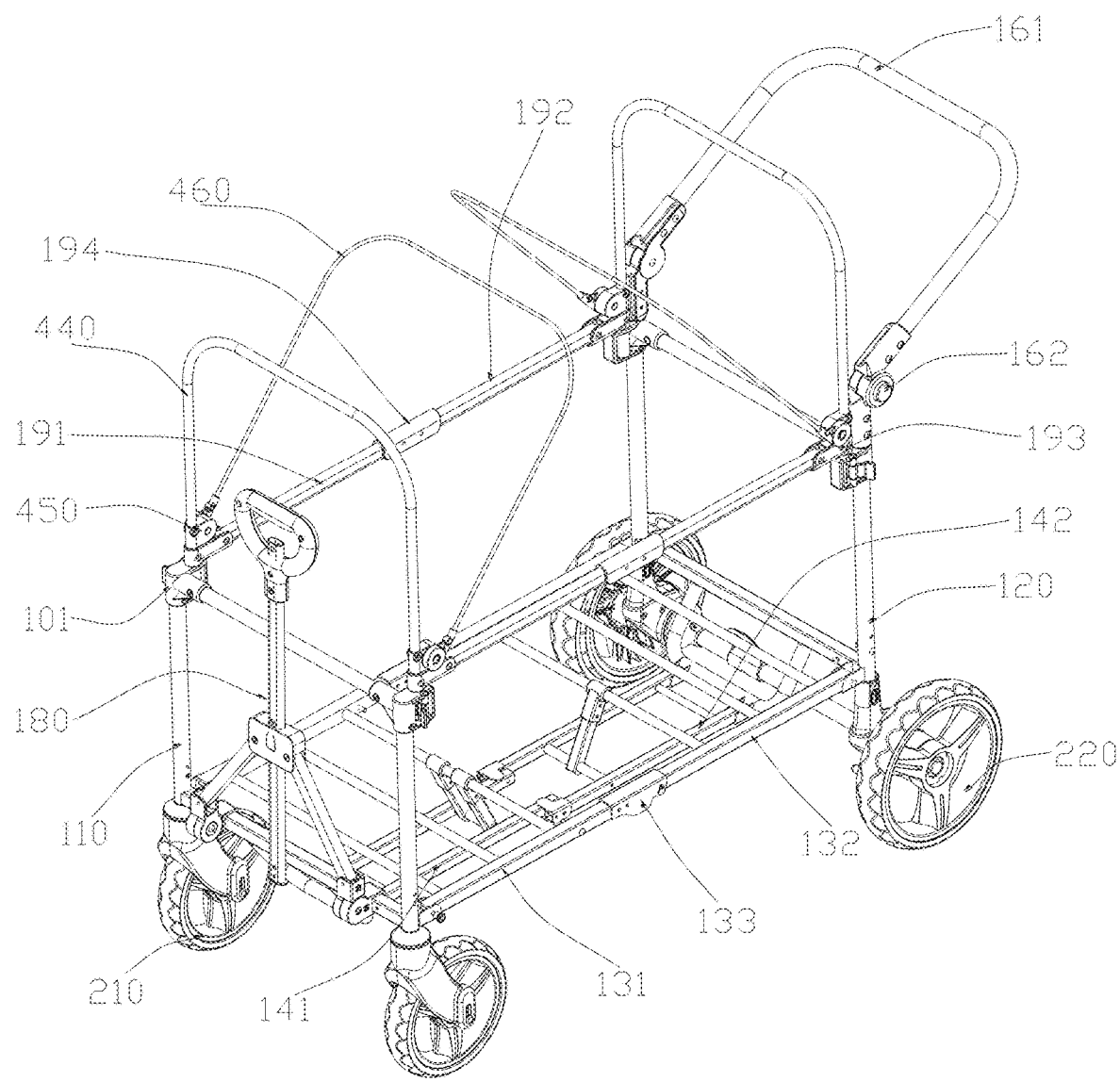
FIG. 14 is a schematic structural diagram of a framework in an unfolded state according to Embodiment II of the present disclosure.
Figure 15:
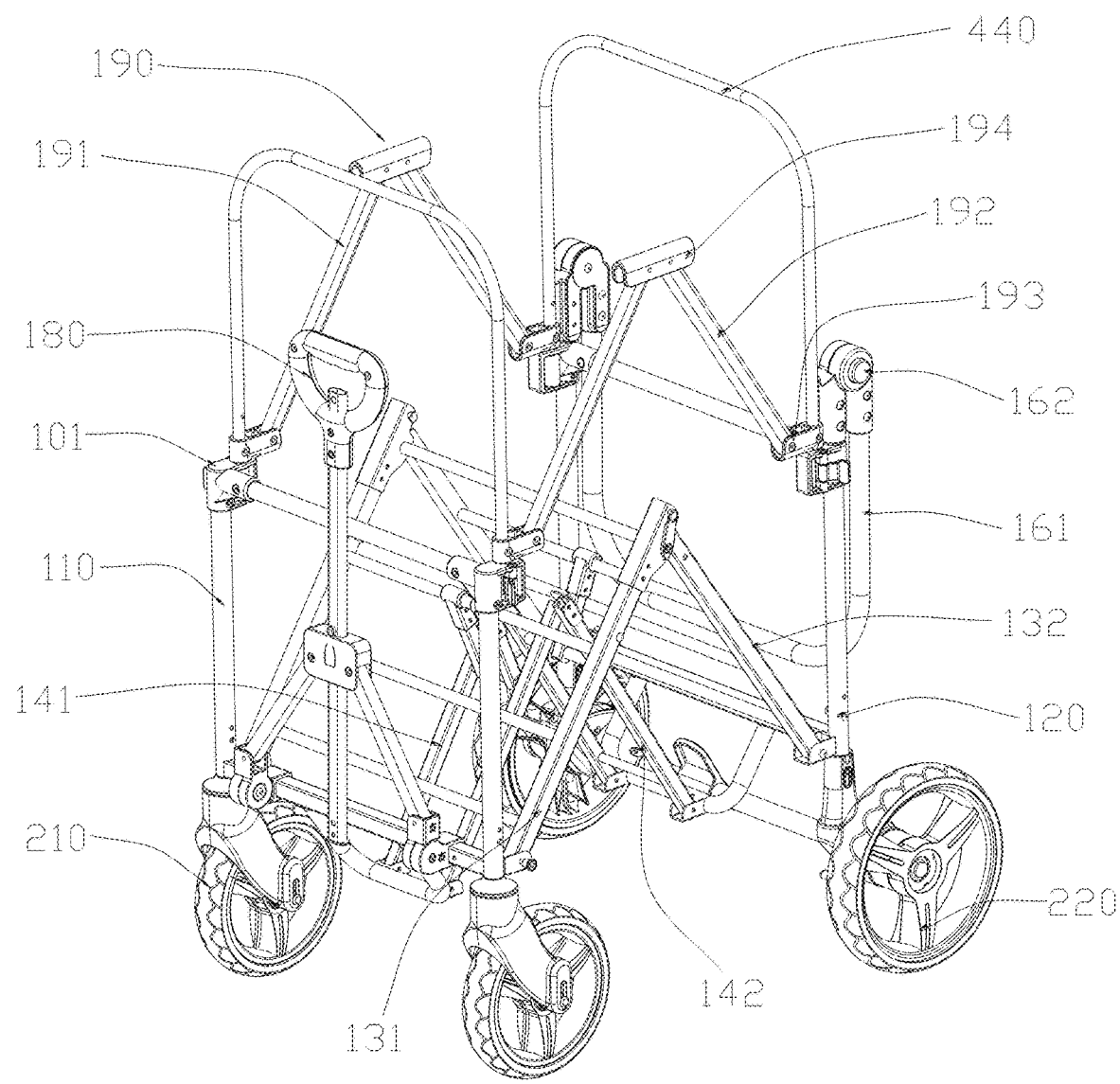
FIG. 15 is a schematic structural diagram of switching of the framework between an unfolded state and a folded state according to Embodiment II of the present disclosure.
Figure 16:
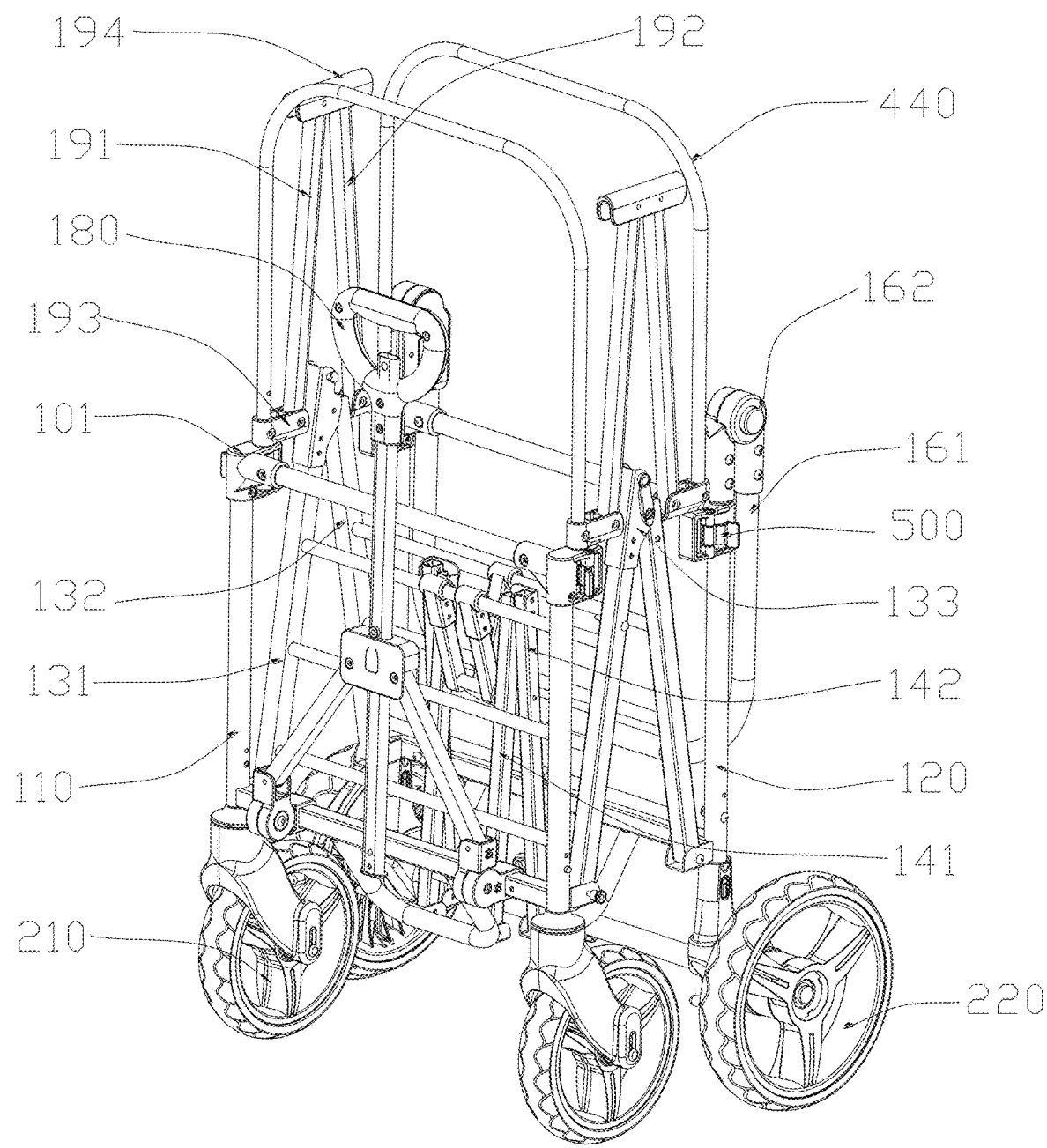
FIG. 16 is a schematic structural diagram of the framework in a folded state according to Embodiment II of the present disclosure.
Figure 17:
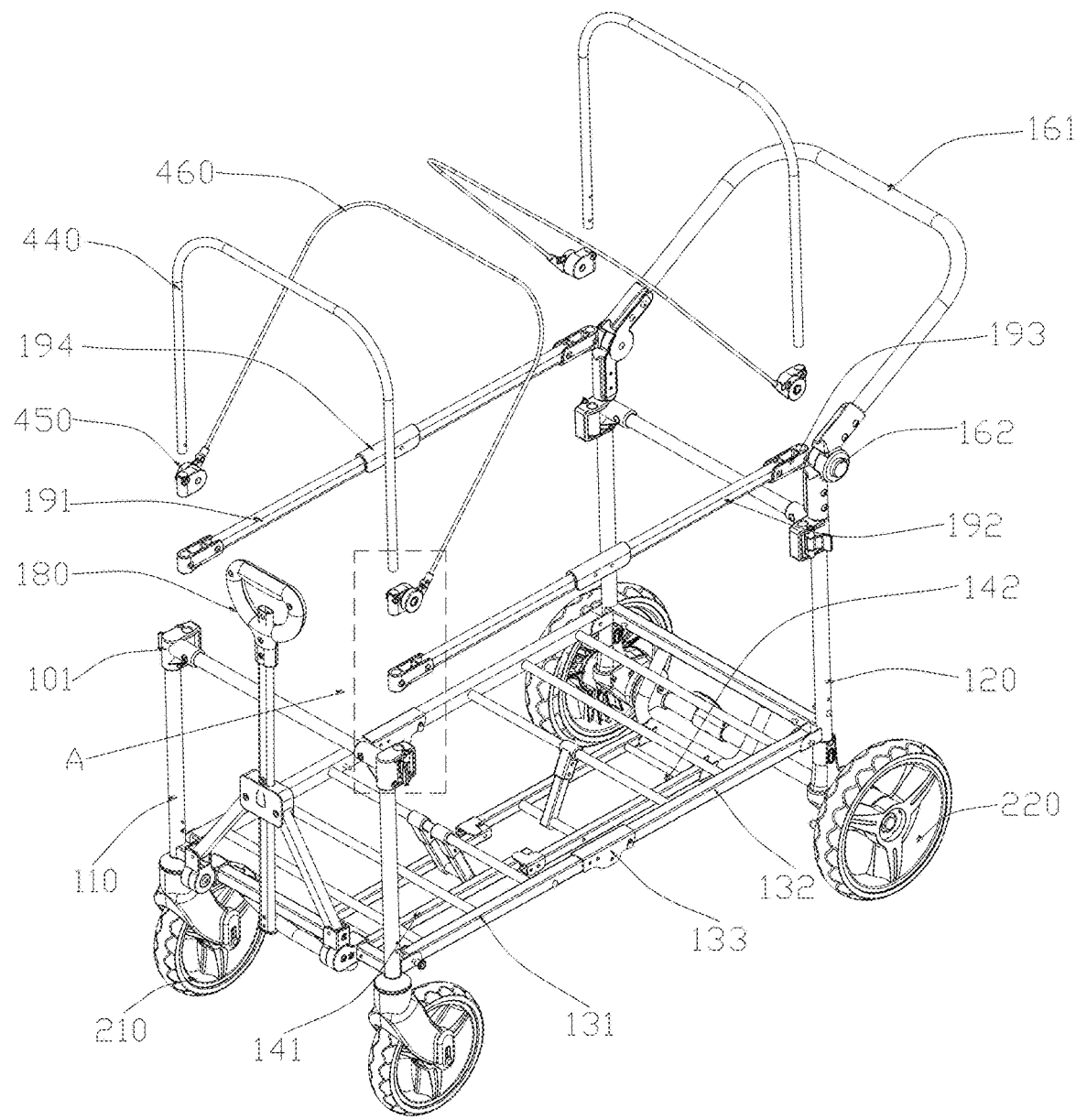
FIG. 17 is a partially structural exploded diagram of the framework in an unfolded state according to Embodiment II of the present disclosure.
Figure 18:
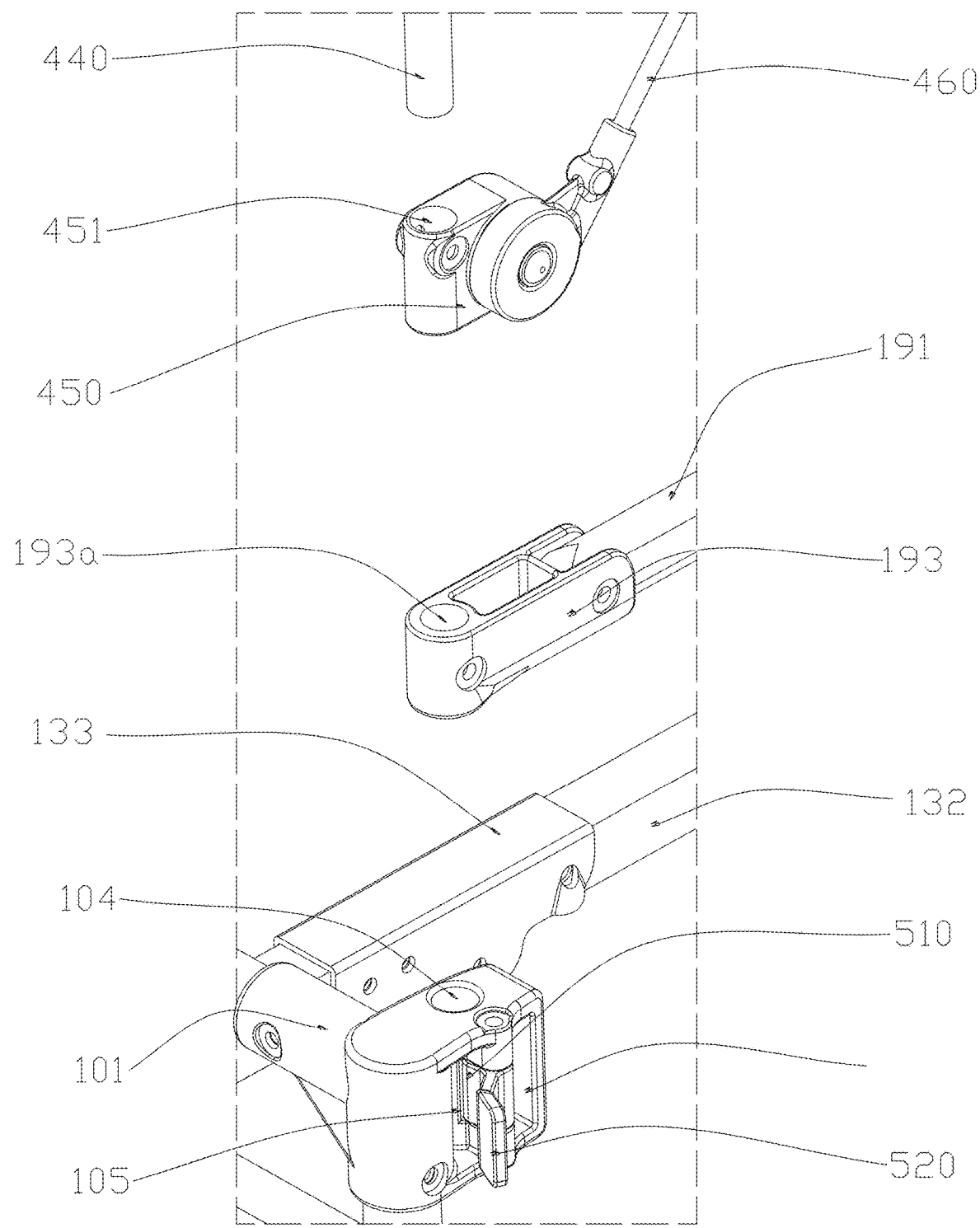
FIG. 18 is an enlarged view of block A in FIG. 17.
Figure 19:
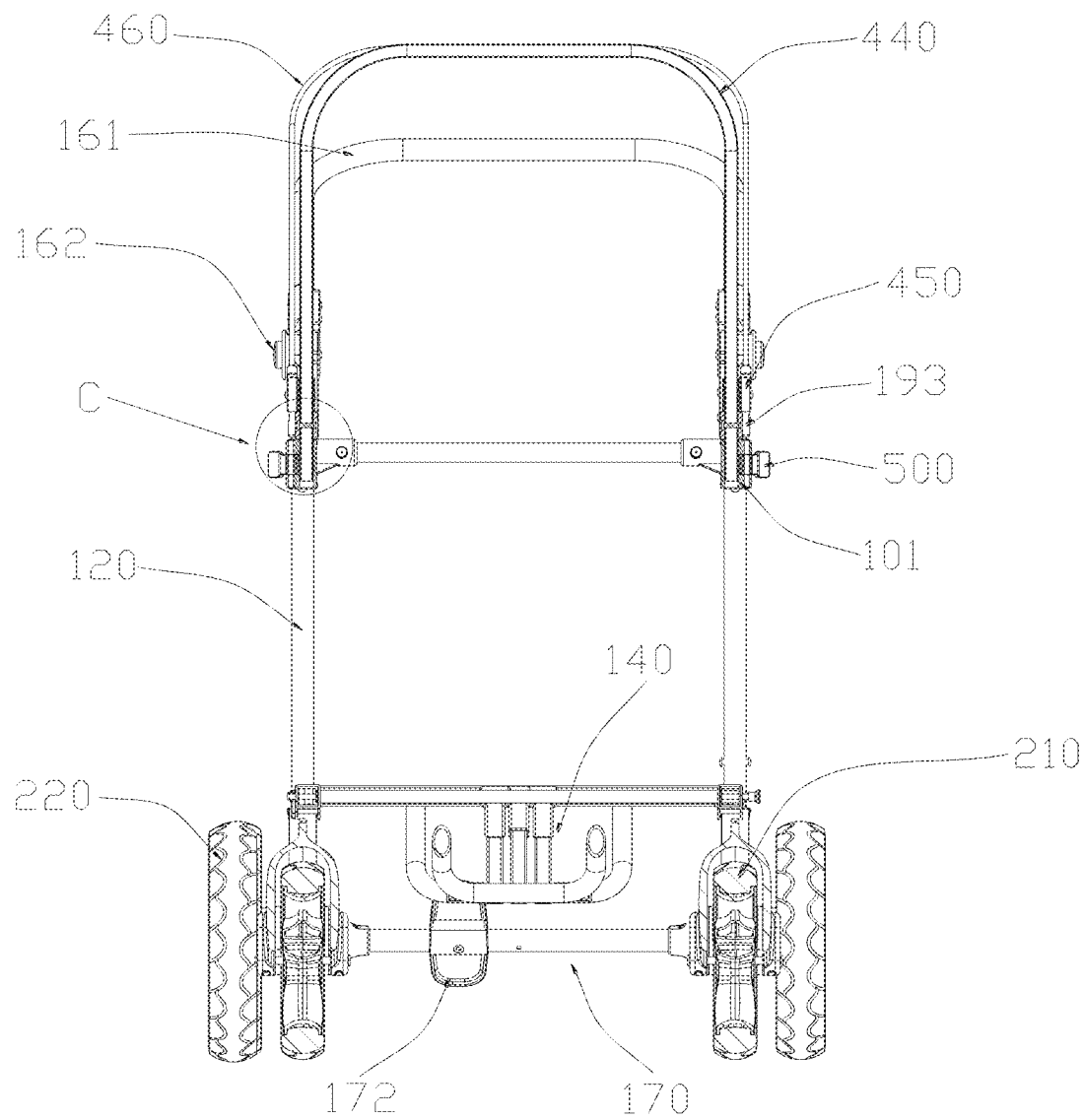
FIG. 19 is a cross-sectional view of the framework in an unfolded state according to Embodiment II of the present disclosure.
Figure 20:
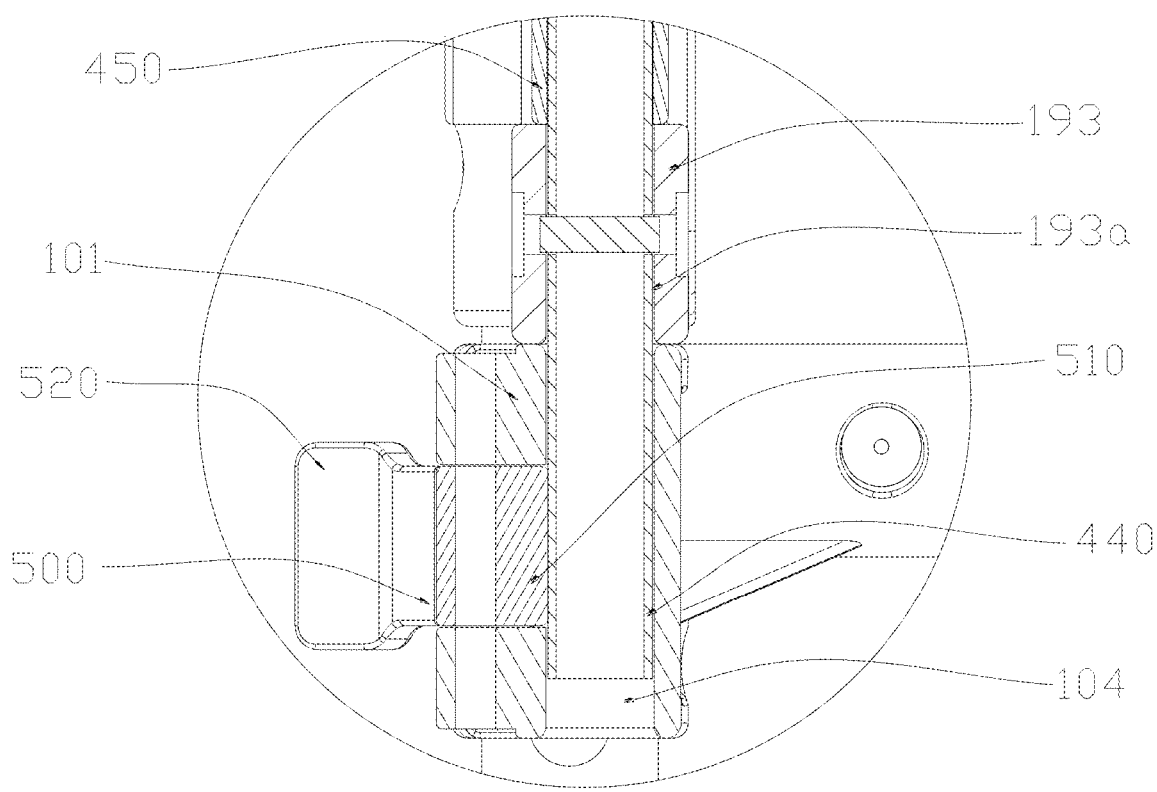
FIG. 20 is an enlarged view of circle C in FIG. 19.
Figure 21:
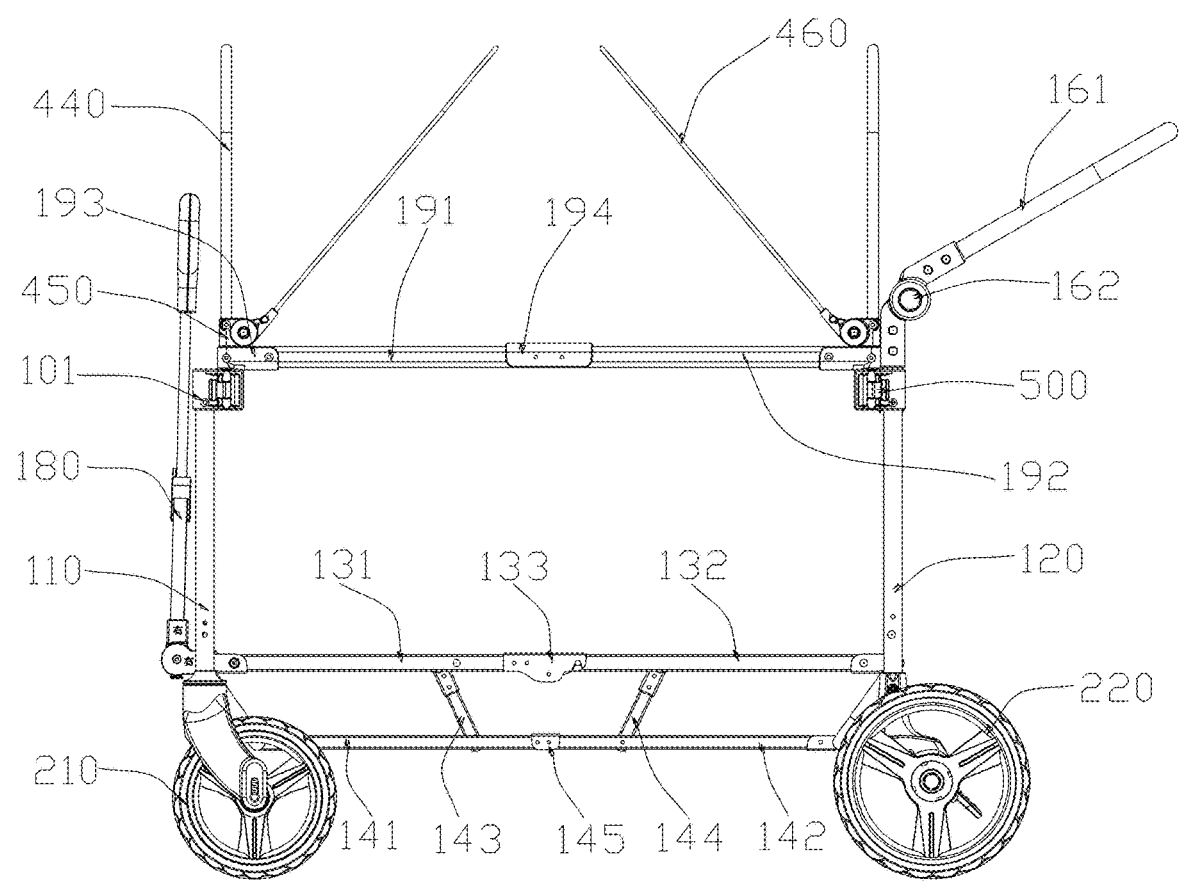
FIG. 21 is a side view of Embodiment II of the present disclosure.

Referring to FIG. 1 to FIG. 13, a folding stroller includes a framework 100 and wheels 200 mounted at a bottom of the framework 100. The framework 100 has a folded state and an unfolded state. The framework 100 includes:

a front bracket assembly 110;

a rear bracket assembly 120, wherein the rear bracket assembly 120 is arranged in a manner of being opposite to the front bracket assembly 110;

a lower bracket assembly 130, wherein the lower bracket assembly 130 includes a first lower bracket unit 131 and a second lower bracket unit 132; a first end of the first lower bracket unit 131 is rotationally connected to a lower end of the front bracket assembly 110; a first end of the second lower bracket unit 132 is rotationally connected to a lower end of the rear bracket assembly 120; a second end of the first lower bracket unit 131 is rotationally connected to a second end of the second lower bracket unit 132; and a support frame assembly 140, wherein the support frame assembly 140 is connected to the lower bracket assembly 130; the support frame assembly 140 includes several support rod and frame units; the support rod and frame units are rotationally connected to at least one adjacent support rod and frame unit; when the framework 100 is in the unfolded state, a downwards sunken foot accommodating space is formed among at least some of the support rod and frame units, the first lower bracket unit 131, and the second lower bracket unit 132.

By the arrangement of the above structure, during use, the front bracket assembly 110 and the rear bracket assembly 120 are respectively pulled in a front direction and a rear direction and separated from each other until the first lower bracket unit 131 and the second lower bracket unit 132 are flushed with each other and in the same plane, and the support frame assembly 140 is in a stretched state. In this case, the framework 100 is in an unfolded state, making it convenient for a user to sit and lie down. The support frame assembly 140 can provide an additional support force to hinder relative rotation of the first lower bracket unit 131 and the second lower bracket unit 132, so that the structure of the product is stable. Moreover, the downwards sunken foot accommodating space is formed among some of the support rod and frame units, the first lower bracket unit 131, and the second lower bracket unit 132. A baby can sit in the stroller and place the feet in the downwards sunken foot accommodating space, so that the baby feels more comfortable when sitting in this product, and a user experience is enhanced. For storage, a middle portion of the lower bracket assembly 130 and a middle portion of the support frame assembly 140 are moved upwards. The first lower bracket unit 131 and the second lower bracket unit 132 rotate relative to each other. The first lower bracket unit 131 rotates relative to the front bracket assembly 110; the second lower bracket unit 132 rotates relative to the front bracket assembly 110; and the support frame assembly 140 rotates relative to the lower bracket assembly 130, the front bracket assembly 110, and the rear bracket assembly 120. The support frame assembly 140 collapses itself, and the front bracket assembly 110 and the rear bracket assembly 120 approach each other. The overall volume of the product is small, which is convenient for storage and transportation.

In this embodiment, the support rod and frame units include a first support frame unit 141, a second support frame unit 142, a first rotating rod unit 143, and a second rotating rod unit 144. A front connecting rod unit 111 is arranged at a lower end of the front bracket assembly 110, and a rear connecting rod unit 121 is arranged at a lower end of the rear bracket assembly 120.

a first end of the first support frame unit 141 is rotatably connected to a lower end of the front connecting rod unit 111; a first end of the second support frame unit 142 is rotatably connected to a lower end of the rear connecting rod unit 121; a second end of the first support frame unit 141 is rotatably connected to the second end of the second support frame unit 142; two ends of the first rotating rod unit 143 are respectively rotatably connected to the first lower support frame unit 131 and the first support frame unit 141; and two ends of the second rotating rod unit 144 are respectively rotatably connected to the second lower support frame unit 132 and the second support frame unit 142.

By the arrangement of the above structure, during use, the front bracket assembly 110 and the rear bracket assembly 120 are respectively pulled in a front direction and a back direction and are separated from each other until the first lower bracket unit 131 and the second lower bracket unit 132 are flush and in the same plane, and the first support frame unit 141 and the second support frame unit 142 are flush and in the same plane. At this point, when the framework 100 is in the unfolded state, it is convenient for a user to sit and lie down. The support frame assembly 140 can provide an additional supporting force to hinder relative rotation of the first lower bracket unit 131 and the second lower bracket unit 132 and stabilize the structure of the product. To store the product, a middle part of the lower bracket assembly 130 and a middle part of the support frame assembly 140 are moved upwards; the first lower bracket unit 131 and the second lower bracket unit 132 rotate relative to each other; the first lower bracket unit 131 rotates relative to the front bracket assembly 110; the second lower bracket unit 132 rotates relative to the rear bracket assembly 120; the first support frame unit 141 and the second support frame unit 142 rotate relative to each other; the first support frame unit 141 rotates relative to the front connecting rod unit 111; the second support frame unit 142 rotates relative to the rear connecting rod unit 121; and the front bracket assembly 110 and the rear bracket assembly 120 are close to each other. The overall volume of the product is small, which is convenient for storage and transportation.

In this embodiment, a downwards sunken foot accommodating space is formed among the first rotating rod unit 143, the second rotating rod unit 144, a portion of the first lower bracket unit 131, a portion of the second lower bracket unit 132, a portion of the first support frame unit 141, and a portion of the second support frame unit 142. By the arrangement of the above structure, during use, a baby can sit in the stroller, and the feet can be placed in the downwards sunken foot accommodating space, so that the infant feels more comfortable when sitting in the product, and a user experience is enhanced.

In this embodiment, the first lower bracket unit 131 includes a first limiting member 133 arranged at the second end; the second end of the second lower bracket unit 132 is rotatably connected to the first limiting member 133; and when the framework 100 is in the unfolded state, the first limiting member 133 resists against the second lower bracket unit 132. By the arrangement of the above structure, during use, when the framework 100 is in the unfolded state, the first lower bracket unit 131 and the second lower bracket unit 132 are flush and in the same plane. At this time, the first limiting member 133 resists against the second lower bracket unit 132, which can hinder the continuously downwards relative rotation between the first lower bracket unit 131 and the second lower bracket unit 132 to limit their relative positions, so that the product is stabilized and fixed in the unfolded state, and it is convenient for use. Furthermore, the product has a stable structure and is safe to use.

In this embodiment, a first locking member 134 is arranged in the second end of the second lower bracket unit 132; a locking end of the first locking member 134 is threaded out of a side wall of the second end of the second lower bracket unit 132; the first limiting member 133 is provided with a first locking hole 135; and when the framework 100 is in the unfolded state, the locking end of the first locking member 134 is inserted into the first locking hole 135. By the arrangement of the above structure, when the framework 100 is in the unfolded state, the first lower bracket unit 131 and the second lower bracket unit 132 are flush and in the same plane. The locking end of the first locking member 134 is inserted into the first locking hole 135, which can lock the first lower bracket unit 131 and the second lower bracket unit 132, hinder the relative rotation between the first lower bracket unit 131 and the second lower bracket unit 132, and improve the stability and safety of the product.

In this embodiment, the first limiting member 133 is provided with an unlocking button 136; a press end of the unlocking button 136 is arranged towards the first locking hole 135; and under the driving of an external force, the press end of the unlocking button 136 is moved towards the first locking hole 135 to drive the locking end of the first locking member 134 to be detached from the first locking hole 135. By the arrangement of the above structure, to fold the product, the press end of the unlocking button 136 is pressed to resist against the locking end of the first locking member 134, thereby driving the locking end of the first locking member 134 to be detached from the first locking hole 135 to relieve the locked state. Meanwhile, the middle part of the lower bracket assembly 130 is moved upwards to fold the product. The operation is convenient.

In this embodiment, a second limiting member 145 is arranged at a second end of the second support frame unit 142; and when the framework 100 is in the unfolded state, the second limiting member 145 resists against the first support frame unit 141. By the arrangement of the above structure, during use, when the framework 100 is in the unfolded state, the first support frame unit 141 and the second support frame unit 142 are flush and in the same plane. At this time, the second limiting member 145 resists against the first support frame unit 141, which can hinder the continuously downwards relative rotation between the first support frame unit 141 and the second support frame unit 142 to limit their relative positions, so that the product is stabilized and fixed in the unfolded state, and it is convenient for use. Furthermore, the product has a stable structure and is safe to use.

In this embodiment, the framework 100 further includes a fixing member 150; a first end of the fixing member 150 is connected to the rear bracket assembly 120; a second end of the fixing member 150 is detachably connected to the front bracket assembly 110; when the framework 100 is in the folded state, the second end of the fixing member 150 is connected to the front bracket assembly 110; and when the framework 100 is in the unfolded state, the second end of the fixing member 150 is detached from the front bracket assembly 110. By the arrangement of the above structure, during use, the framework 100 is adjusted to the folded state. At this time, a distance between the front bracket assembly 110 and the rear bracket assembly 120 is shortened; the second end of the fixing member 150 is connected to the front bracket assembly 110, which can hinder the front bracket assembly 110 to move away from the rear bracket assembly 120, thereby hindering the framework 100 from being switched to the unfolded state, improving the stability of storage and transportation of the product, and facilitating a user to store and transport the product; and detaching the second end of the fixing member 150 from the front bracket assembly 110 can allow the framework 100 to be switched to the unfolded state.

In this embodiment, the framework 100 further includes a push rod assembly 161 and a lock fastener 162; the push rod assembly 161 is rotatably connected to the rear bracket assembly 120; the lock fastener 162 is connected to the push rod assembly 161 and the rear bracket assembly 120; and the lock fastener 162 is configured to allow or hinder relative rotation between the push rod assembly 161 and the rear bracket assembly 120. By the arrangement of the above structure, during use, the push rod assembly 161 is rotated to enable a gripping end of the push rod assembly 161 to be away from the rear bracket assembly 120; the lock fastener 162 is moved to fix the push rod assembly 161, which can facilitate a user to grip the gripping end of the push rod assembly 161 and push and pull the product. Furthermore, the user can rotate the push rod assembly 161 according to a need to adjust an angle between the push rod assembly 161 and the rear bracket assembly 120, thereby adjusting a height of the gripping end of the push rod assembly 161 to improve the comfort level of the product. Different users can have appropriate gripping heights, making it more convenient to use. When the push rod assembly 161 is rotated to fit the rear bracket assembly 120, the push rod assembly 161 can be effectively stored, so that a length of the product is reduced, and transportation and storage of the product are facilitated.

In this embodiment, the wheels 200 include movable casters 210 and fixed casters 220; the movable casters 210 are connected to a bottom of the front bracket assembly 110; and the fixed casters 220 are connected to a bottom of the rear bracket assembly 120. By the arrangement of the above structure, during use, the movable casters 210 and the fixed casters 220 can cooperate to facilitate a user to push the framework 100, so that it is more convenient to move the product. Moreover, the movable casters 210 can rotate around a vertical axis to allow the movable casters 210 to change a direction, thereby facilitating the users to change a movement direction of the stroller and simplifying the operation.

In this embodiment, the framework 100 further includes a second locking assembly 170; the second locking assembly 170 is moved between a locked position and an unlocked position; several second locking holes 221 are provided on inner sides of the fixed casters 220 along edges of rotating shafts; when the second locking assembly 170 is moved to the locked position, a locking rod 171 of the second locking assembly 170 is inserted into the second locking holes 221; and when the second locking assembly 170 is moved to the unlocked position, the locking rod 171 of the second locking assembly 170 is detached from the second locking holes 221. By the arrangement of the above structure, when the second locking assembly 170 is moved to the locked position, the locking rod 171 is inserted into the second locking holes 221. The locking rod 171 hinders the rotation of the fixed casters 220, thereby hindering the movement of the stroller, so that the stroller can stably stop in place and be safer to use. When the second locking assembly 170 is moved to the unlocked position, the locking rod 171 is separated from the locking holes 221. At this time, the fixed casters 220 can rotate freely, making it convenient for a user to push, pull, and move the stroller. It is convenient and labor-saving to move the product.

In this embodiment, the second locking assembly 170 further includes a driving pedal 172 and a driving rod 173; the driving pedal 172 is connected to the driving rod 173; a driving slope 174 is arranged at an end portion of the driving rod 173; the driving pedal 172 and the driving rod 173 rotate around a rotating shaft of the driving rod 173 under the action of an external force; and a first end of the locking rod 171 resists against the driving slope 174 and slides along a surface of the driving slope 174 to allow the locking rod 171 to extend and retract and to be inserted or detached from the second locking holes 221. By the arrangement of the above structure, during use, the driving pedal 172 is stepped on to drive the driving rod 173 and the driving slope 174 to rotate. The driving slope 174 drives the locking rod 171 to translate in an axial direction to be then inserted into the second locking holes 221 to hinder the rotation of the fixed casters 220, so that the stroller can be stably stopped in place and safer to use.

In this embodiment, the second locking assembly 170 further includes a reset spring 175; one end of the reset spring 175 is connected to a connecting portion at the bottom of the framework 100, and the other end of the reset spring 175 is connected to the locking rod 171; and an elastic force of the reset spring 175 enables the locking rod 171 to have a tendency to move away from the second locking holes 221. By the arrangement of the above structure, during use, when the second locking assembly 170 is moved to the unlocked position, the locking rod 171 is detached from the second locking holes 221 under the action of the elastic force of the reset spring 175, so that the fixed casters 220 are allowed to rotate freely, facilitating a user to move the stroller and making the product convenient to use.

In this embodiment, friction lines 176 are arranged on an upper surface of the driving pedal 172. By the arrangement of the above structure, the friction lines 176 can increase a friction coefficient of the upper surface of the driving pedal 172. When a user steps on the driving pedal 172, a friction force between the sole of the foot of the user and the upper surface of the driving pedal 172 is increased, so that it is easier for the user to step on the driving pedal 172. The operation is simple.

In this embodiment, the folding stroller further includes a cover body 300; a first connector 101 is arranged at an upper end of each of the front bracket assembly 110 and the rear bracket assembly 120; an upper end of the cover body 300 is connected to the first connectors 101; and a lower end of the cover body 300 is connected to a lower end of the front bracket assembly 110 and a lower end of the rear bracket assembly 120 or the lower bracket assembly 130. By the arrangement of the above structure, during use, the upper end of the cover body 300 is connected to the first connector 101, and the lower end of the cover body 300 is connected to the lower end of the front bracket assembly 110 and the lower end of the rear bracket assembly 120 or the lower bracket assembly 130. The cover body 300 can be stably connected to the framework 100, and an inner wall of the cover body 300 forms an accommodating space, which facilitates a user to sit and lie down in the accommodating space and improves the comfort and safety of the product.

In this embodiment, a connecting strap 310 is arranged at the upper end of the cover body 300; through holes 102 are provided on the first connectors 101; and a free end of the connecting strap 310 passes through the through holes 102 and are connected to a surface of the cover body 300. By the arrangement of the above structure, during use, the free end of the connecting strap 310 passes through the through hole 102 and is connected to the surface of the cover body 300 to achieve the connection between the cover body 300 and the first connectors 101. The product has a stable structure and is conveniently connected. Preferably, the free end of the connecting strap 310 is connected to the surface of the cover body 300 through a hook and loop fastener or a button. The connection is convenient and stable.

In this embodiment, the folding stroller further includes a sunshade assembly 400; the sunshade assembly 400 includes a second connector 410, several sunshade brackets 420, and a sunshade body 430; and the second connector 410 is detachably connected to the first connectors 101 to connect or detach the sunshade assembly 400 to or from the framework 100. By the arrangement of the above structure, during use, the second connector 410 is connected to or detached from the first connectors 101 to mount or remove the sunshade assembly 400, making it easier for a user to select whether to use the sunshade assembly 400 and making it more convenient for a user to use the product. Moreover, the sunshade brackets 420 can stably support the sunshade body 430, to shield the user from the sunlight and provide a better user experience.

In this embodiment, one of the first connector 101 and the second connector 410 is provided with an insertion block 103, and the other one of the first connector 101 and the second connector 410 is provided with an insertion slot; and the insertion block 103 is inserted into the insertion slot. By the arrangement of the above structure, during use, the insertion block 103 is inserted into the insertion slot, making it convenient for a user to connect the first connector 101 to the second connector 410, so that the mounting is convenient.

In this embodiment, the second connector 410 is provided with a first rotating portion 411 and a second rotating portion 412; the first rotating portion 411 is rotatably connected to the second rotating portion 412; one of the sunshade brackets 420 is connected to the first rotating portion 411, and another sunshade bracket 420 is connected to the second rotating portion 412. By the arrangement of the above structure, during use, rotating the second rotating portion 412 can make the various sunshade brackets 420 approach or separated from each other to unfold or fold the sunshade body 430, so that a user can conveniently adjust a shading area of the sunshade body 430, and a better user experience is achieved.

In this embodiment, the framework 100 further includes a traction assembly 180; the traction assembly 180 is rotatably connected to the front bracket assembly 110; and the traction assembly 180 is configured to allow a user to pull product. By the arrangement of the above structure, during use, a user can move the product by pulling the traction assembly 180. The user can select to push or pull the product. More usage options are provided for the user.

In this embodiment, the traction assembly 180 includes a traction rod 181, a connecting rod 182, and a connecting shell 183; the traction rod 181 is slidably connected to the connecting shell 183; one end of the connecting rod 182 is rotatably connected to a lower part of the front bracket assembly 110, and the other end of the connecting rod 182 is connected to the connecting shell 183; the traction rod 181 is provides with several third locking positions; the connecting shell is provided with a third locking member; and the locking member is connected to any one of the third locking positions. By the arrangement of the above structure, when the traction assembly 180 is used, the third locking member is connected to any third locking position, which can adjust a length of extension of the traction rod 181, making it convenient for a user to grip and pull the product. When the traction assembly 180 is stored, the third locking member can be connected to the topmost third locking position to shorten the length of extension of the traction rod 181 and facilitate the storage of the product.

Embodiment II

Referring to FIG. 14 to FIG. 21, this embodiment discloses a folding stroller, a main structure of which is basically the same as that of Embodiment I.

A main difference between this embodiment and Embodiment I is that in this embodiment, a connection mode for a sunshade assembly 400 and the framework 100. The framework 100 further includes eccentric locking pieces 500. The sunshade assembly 400 is provided with mounting columns 440 and a sunshade body 430 connected to the mounting columns 440; first connectors 101 are provided with insertion holes 104 and openings 105 communicated to the insertion holes 104; the mounting columns 440 are inserted into the insertion holes 104; eccentric locking pieces 500 are connected to the first connectors 101 and are rotated between a locking position and an unlocking position; and when the eccentric locking pieces 500 are rotated to the locking position, eccentric portions 510 of the eccentric locking pieces 500 pass through the openings 105 and resist against surfaces of the mounting columns 440. By the arrangement of the above structure, during use, lower end portions of the mounting columns 440 are inserted along the insertion holes 104. The eccentric locking pieces 500 are rotated to the locking position, so that the eccentric portions 510 of the eccentric locking pieces 500 pass through the openings 105, and the eccentric portions 510 resist against the lower end portions of the mounting columns 440, to fix the mounting columns 440, thus effectively fixing the sunshade body 430. The structure of the product is more stable. To remove the sunshade assembly 400, only the eccentric locking pieces 500 need to be rotated to the unlocking position. The eccentric portions 510 are removed from the lower end portions of the mounting columns 440, making it convenient for a user to pull out the mounting columns 440 from the insertion holes 104. It is more convenient to mount and remove the sunshade assembly 400, and the user can choose whether to mount or remove the sunshade assembly 400 according to a need. Preferably, each eccentric locking piece 500 has a rotating grip 520. A user can turn the rotating grip 520 to make the eccentric locking piece 500 rotate between the locking position and the unlocking position. By using the rotating grip 520, the user can adjust the position of the eccentric locking piece 500 more easily, so that the user experience is better.

In this embodiment, the framework 100 further includes an upper bracket assembly 190; the upper bracket assembly 190 includes a first upper bracket unit 191, a second upper bracket unit 192, and two connecting bracket units 193; a first end of the first upper bracket unit 191 and a first end of the second upper bracket unit 192 are respectively rotationally connected to the two connecting bracket units 193; the two connecting bracket units 193 are connected to the mounting columns 440; and a second end of the first upper bracket unit 191 is rotationally connected to a second end of the second upper bracket unit 192. By the arrangement of the above structure, during use, the two connecting bracket units 193 are respectively connected to the mounting columns 440 on front and rear sides, and then two ends of the upper bracket assembly 190 are fixed, so that the upper bracket assembly 190 can support the front bracket assembly 110 and the rear bracket assembly 120, which further improves the structural stability of the product. Moreover, when the framework 100 transitions from the unfolded state to the folded state, the first end of the first upper bracket unit 191 and the first end of the second upper bracket unit 192 both rotate relative to the connecting bracket units 193, and the second end of the first upper bracket unit 191 rotates relative to the second end of the second upper bracket unit 192, so that the framework 100 transitions to the folded state more smoothly, and the product is more convenient to use. Preferably, each connecting bracket unit 193 is provided with a first mounting hole 193a. The mounting columns 440 pass through the first mounting holes 193a and are inserted into the insertion holes 104, to achieve fixed connection to the connecting bracket unit 193, so that the connection is convenient and stable. Meanwhile, the connection bracket units 193 may also be directly connected to the front bracket assembly 110 and/or the rear bracket assembly 120, without using the mounting columns 440. Preferably, the upper bracket assembly 190 further comprises a middle limiting member 194. The second end of the first upper bracket unit 191 and the second end of the second upper bracket unit 192 are rotationally connected through the middle limiting member 194. Furthermore, an edge of the middle limiting member 194 resists against an upper surface of the first upper bracket unit 191 and an upper surface of the second upper bracket unit 192, to limit a direction and angle of rotation between the first upper bracket unit 191 and the second upper bracket unit 192.

In this embodiment, the sunshade assembly 400 further includes third connectors 450 and rotating brackets 460. The third connectors 450 are provided with second mounting holes 451, and the mounting columns 440 pass through the second mounting holes 451 in sequence and are inserted into the insertion holes 104 through the first mounting holes 193a, to connect the third connectors 450 to the mounting columns 440. The rotating bracket 460 is rotationally connected to the third connectors 450, and the sunshade body 430 is connected to the mounting columns 440 and the rotating brackets 460. When a user rotates the rotating brackets 460, the sunshade body 430 can be controlled to be opened or closed.

Embodiment III

Figure 22:
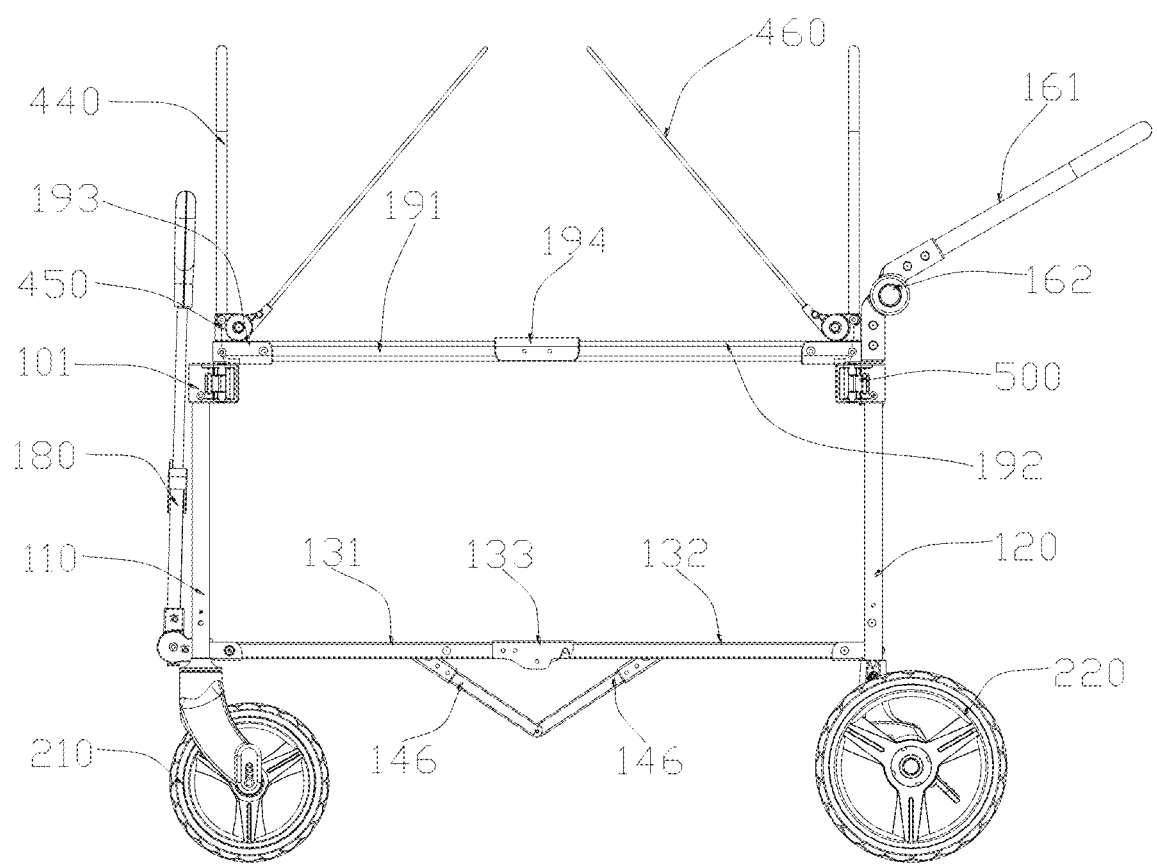
FIG. 22 is a side view of Embodiment III of the present disclosure.

Referring to FIG. 22, this embodiment discloses a folding stroller, a main structure of which is basically the same as that of Embodiment II.

A main difference between this embodiment and Embodiment I is that in this embodiment, the support rod and frame units include two third support frame units 146; first ends of the two third support frame units 146 are respectively rotationally connected to the first lower bracket unit 131 and the second lower bracket unit 132; second ends of the two third support frame units 146 are rotationally connected; and the downwards sunken foot accommodating space is formed among a portion of the first lower bracket unit 131, a portion of the second lower bracket unit 132, and the two third support frame units 146. By the arrangement of the above structure, when the framework 100 is in the unfolded state, extension directions of the first lower bracket unit 131 and the second lower bracket unit 132 are the same, forming a whole. The foot accommodating space with a triangular cross section is formed among two third support frame units 146, the first lower bracket unit 131, and the second lower bracket unit 132. The foot accommodating space has a more stable structure, which can facilitate a passenger sitting and lying in the stroller to place the feet and have a more comfortable passenger experience. Moreover, the two third support frame units 146 can effectively provide a support force to the first lower bracket unit 131 and the second lower bracket unit 132, making the structure of the framework 100 more stable.

Embodiment IV

Figure 23:
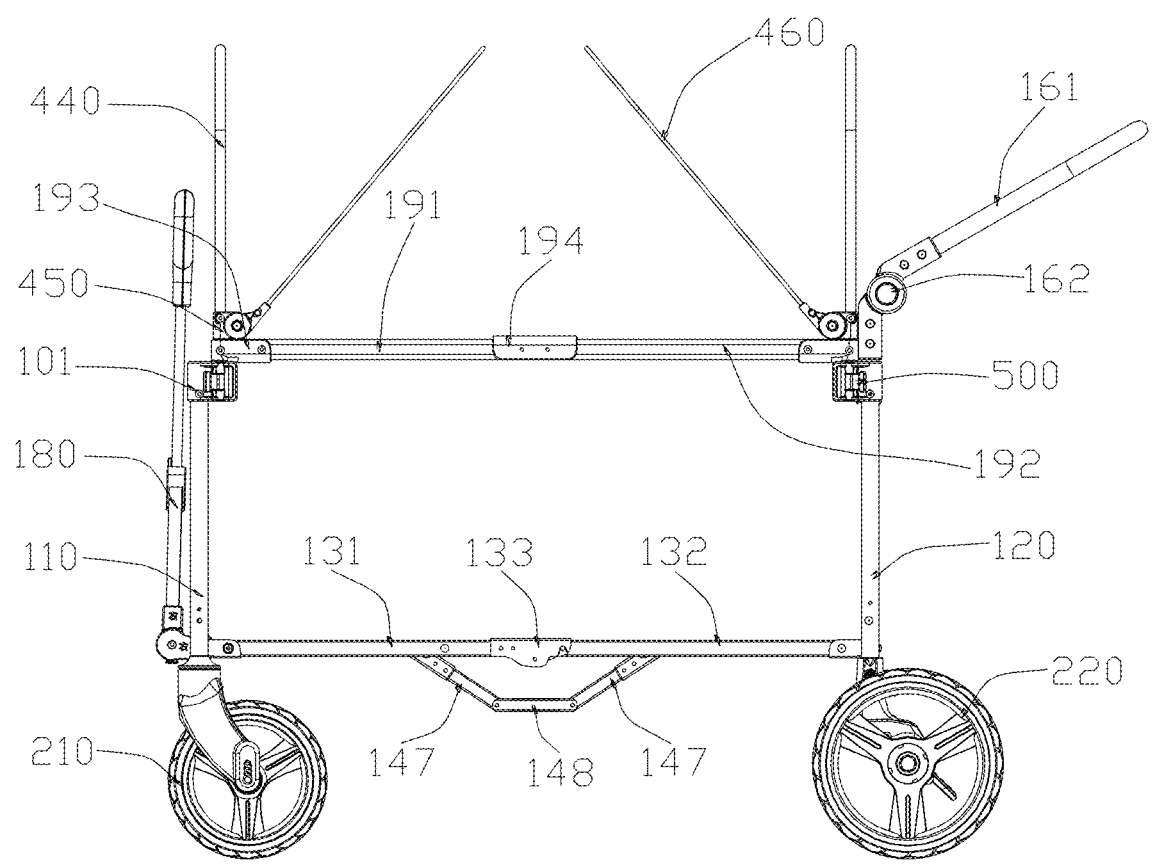
FIG. 23 is a side view of Embodiment IV of the present disclosure.

Referring to FIG. 23, this embodiment discloses a folding stroller, a main structure of which is basically the same as that of Embodiment II.

A main difference between this embodiment and Embodiment I is that in this embodiment, the support rod and frame units include two fourth support frame units 147 and a middle connecting rod unit 148; first ends of the two fourth support frame units 147 are respectively rotationally connected to the first lower bracket unit 131 and the second lower bracket unit 132; second ends of the two fourth support frame units 147 are respectively rotationally connected to the middle connecting rod unit 148; and the downwards sunken foot accommodating space is formed among a portion of the first lower bracket unit 131, a portion of the second lower bracket unit 132, the middle connecting rod unit 148, and the two fourth support frame units 147. By the arrangement of the above structure, when the framework 100 is in the unfolded state, extension directions of the first lower bracket unit 131 and the second lower bracket unit 132 are the same, forming a whole. A foot accommodating space with a trapezoidal cross section is formed among the first lower bracket unit 131, the second lower bracket unit 132, the middle connecting rod unit 148, and the two fourth support frame units 147. The foot accommodating space can accommodate the feet of a passenger, making the passenger sitting in the stroller feel more comfortable and have a better user experience. Moreover, the cooperation between the two fourth support frame units 147 and the middle connecting rod unit 148 can improve the structural stability of connection between the first lower bracket unit 131 and the second lower bracket unit 132, thereby prolonging the service life of the product.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

The invention claimed is:

1. A folding stroller, comprising a framework and wheels mounted at a bottom of the framework, wherein the framework has a folded state and an unfolded state; the framework comprises:
   a front bracket assembly;
   a rear bracket assembly, wherein the rear bracket assembly is arranged in a manner of being opposite to the front bracket assembly;
   a lower bracket assembly, wherein the lower bracket assembly comprises a first lower bracket unit and a second lower bracket unit; a first end of the first lower bracket unit is rotationally connected to a lower end of the front bracket assembly; a first end of the second lower bracket unit is rotationally connected to a lower end of the rear bracket assembly; a second end of the first lower bracket unit is rotationally connected to a second end of the second lower bracket unit; and
   a support frame assembly, wherein the support frame assembly is connected to the lower bracket assembly; the support frame assembly comprises several support rod and frame units; the support rod and frame units are rotationally connected to at least one adjacent support rod and frame unit; when the framework is in the unfolded state, a downwards sunken foot accommodating space is formed among at least some of the support rod and frame units, the first lower bracket unit, and the second lower bracket unit;
   wherein the first lower bracket unit comprises a first limiting member arranged at the second end of the second first lower bracket unit; the second end of the second lower bracket unit is rotatably connected to the first limiting member; and when the framework is in the unfolded state, the first limiting member resists against the second lower bracket unit;
   wherein a first locking member is arranged in the second end of the second lower bracket unit; a locking end of the first locking member is threaded out of a side wall of the second end of the second lower bracket unit; the first limiting member is provided with a first locking hole; and when the framework is in the unfolded state, the locking end of the first locking member is inserted into the first locking hole.

2. The folding stroller according to claim 1, wherein the support rod and frame units comprise a first support frame unit, a second support frame unit, a first rotating rod unit, and a second rotating rod unit; a front connecting rod unit is arranged at the lower end of the front bracket assembly; a rear connecting rod unit is arranged at the lower end of the rear bracket assembly; a first end of the first support frame unit is rotationally connected to a lower end of the front connecting rod unit; a first end of the second support frame unit is rotationally connected to a lower end of the rear connecting rod unit; a second end of the first support frame unit is rotationally connected to the second end of the second support frame unit; two ends of the first rotating rod unit are respectively rotationally connected to the first lower bracket unit and the first support frame unit; and two ends of the second rotating rod unit are respectively rotationally connected to the second lower bracket unit and the second support frame unit.

3. The folding stroller according to claim 2, wherein the downwards sunken foot accommodating space is formed among the first rotating rod unit, the second rotating rod unit, a portion of the first lower bracket unit, a portion of the second lower bracket unit, a portion of the first support frame unit, and a portion of the second support frame unit.

4. The folding stroller according to claim 1, wherein the support rod and frame units comprise two third support frame units; first ends of the two third support frame units are respectively rotationally connected to the first lower bracket unit and the second lower bracket unit; second ends of the two third support frame units are rotationally connected; and the downwards sunken foot accommodating space is formed among a portion of the first lower bracket unit, a portion of the second lower bracket unit, and the two third support frame units.

5. The folding stroller according to claim 1, wherein the support rod and frame units comprise two fourth support frame units and a middle connecting rod unit; first ends of the two fourth support frame units are respectively rotationally connected to the first lower bracket unit and the second lower bracket unit; second ends of the two fourth support frame units are respectively rotationally connected to the middle connecting rod unit; and the downwards sunken foot accommodating space is formed among a portion of the first lower bracket unit, a portion of the second lower bracket unit, the middle connecting rod unit, and the two fourth support frame units.

6. The folding stroller according to claim 1, wherein the first limiting member is provided with an unlocking button; a press end of the unlocking button is arranged towards the first locking hole; and under the driving of an external force, the press end of the unlocking button is moved towards the first locking hole to drive the locking end of the first locking member to be detached from the first locking hole.

7. The folding stroller according to claim 2, wherein a second limiting member is arranged at a second end of the second support frame unit; and when the framework is in the unfolded state, the second limiting member resists against the first support frame unit.

8. The folding stroller according to claim 1, wherein the framework further comprises a fixing member; a first end of the fixing member is connected to the rear bracket assembly; a second end of the fixing member is detachably connected to the front bracket assembly; when the framework is in the folded state, the second end of the fixing member is connected to the front bracket assembly; and when the framework is in the unfolded state, the second end of the fixing member is detached from the front bracket assembly.

9. The folding stroller according to claim 1, wherein the framework further comprises a push rod assembly and a lock fastener; the push rod assembly is rotatably connected to the rear bracket assembly; the lock fastener is connected to the push rod assembly and the rear bracket assembly; and the lock fastener is configured to allow or hinder relative rotation between the push rod assembly and the rear bracket assembly.

10. The folding stroller according to claim 1, wherein the wheels comprise movable casters and fixed casters; the movable casters are connected to a bottom of the front bracket assembly; and the fixed casters are connected to a bottom of the rear bracket assembly; wherein the framework further comprises a second locking assembly; the second locking assembly is moved between a locked position and an unlocked position; several second locking holes are provided on inner sides of the fixed casters along edges of rotating shafts; when the second locking assembly is moved to the locked position, a locking rod of the second locking assembly is inserted into the second locking holes; and when the second locking assembly is moved to the unlocked position, the locking rod of the second locking assembly is detached from the second locking holes.

11. The folding stroller according to claim 1, further comprising a cover body, wherein a first connector is arranged at an upper end of each of the front bracket assembly and the rear bracket assembly; an upper end of the cover body is connected to the first connectors; and a lower end of the cover body is connected to a lower end of the front bracket assembly and a lower end of the rear bracket assembly or the lower bracket assembly.

12. The folding stroller according to claim 11, further comprising a sunshade assembly, wherein the sunshade assembly comprises a second connector; and the second connector is detachably connected to the first connectors to connect or detach the sunshade assembly to or from the framework.

13. The folding stroller according to claim 12, wherein one of the first connector and the second connector is provided with an insertion block, and the other one of the first connector and the second connector is provided with an insertion slot; and the insertion block is inserted into the insertion slot.

14. The folding stroller according to claim 12, wherein the framework further comprises an eccentric locking piece; the sunshade assembly is provided with a mounting column and a sunshade body connected to the mounting column; the first connector is provided with an insertion hole and an opening communicated to the insertion hole; the mounting column is inserted into the insertion hole; the eccentric locking piece is connected to the first connector and is rotated between a locking position and an unlocking position; and when the eccentric locking piece is rotated to the locking position, an eccentric portion of the eccentric locking piece passes through the opening and resists against a surface of the mounting column.

15. The folding stroller according to claim 14, wherein the framework further comprises an upper bracket assembly; the upper bracket assembly comprises a first upper bracket unit, a second upper bracket unit, and two connecting bracket units; a first end of the first upper bracket unit and a first end of the second upper bracket unit are respectively rotationally connected to the two connecting bracket units; the two connecting bracket units are connected to the mounting column; and a second end of the first upper bracket unit is rotationally connected to a second end of the second upper bracket unit.

16. A folding stroller, comprising a framework and wheels mounted at a bottom of the framework, wherein the framework has a folded state and an unfolded state; the framework comprises:
a front bracket assembly;
a rear bracket assembly, wherein the rear bracket assembly is arranged in a manner of being opposite to the front bracket assembly;
a lower bracket assembly, wherein the lower bracket assembly comprises a first lower bracket unit and a second lower bracket unit; a first end of the first lower bracket unit is rotationally connected to a lower end of the front bracket assembly; a first end of the second lower bracket unit is rotationally connected to a lower end of the rear bracket assembly; a second end of the first lower bracket unit is rotationally connected to a second end of the second lower bracket unit; and
a support frame assembly, wherein the support frame assembly is connected to the lower bracket assembly; the support frame assembly comprises several support rod and frame units; the support rod and frame units are rotationally connected to at least one adjacent support rod and frame unit; when the framework is in the unfolded state, a downwards sunken foot accommodating space is formed among at least some of the support rod and frame units, the first lower bracket unit, and the second lower bracket unit;
wherein the wheels comprise movable casters and fixed casters; the movable casters are connected to a bottom of the front bracket assembly; and the fixed casters are connected to a bottom of the rear bracket assembly; wherein the framework further comprises a second locking assembly; the second locking assembly is moved between a locked position and an unlocked position; several second locking holes are provided on inner sides of the fixed casters along edges of rotating shafts; when the second locking assembly is moved to the locked position, a locking rod of the second locking assembly is inserted into the second locking holes; and when the second locking assembly is moved to the unlocked position, the locking rod of the second locking assembly is detached from the second locking holes;
wherein the second locking assembly further comprises a driving pedal and a driving rod; the driving pedal is connected to the driving rod; a driving slope is arranged at an end portion of the driving rod; the driving pedal and the driving rod rotate around a rotating shaft of the driving rod under the action of an external force; and a first end of the locking rod resists against the driving slope and slides along a surface of the driving slope to allow the locking rod to extend and retract and to be inserted or detached from the second locking holes.

17. The folding stroller according to claim 16, wherein the second locking assembly further comprises a reset spring; one end of the reset spring is connected to a connecting portion at the bottom of the framework, and the other end of the reset spring is connected to the locking rod; and an elastic force of the reset spring enables the locking rod to have a tendency to move away from the second locking holes.

18. A folding stroller, comprising a framework and wheels mounted at a bottom of the framework, wherein the framework has a folded state and an unfolded state; the framework comprises:
a front bracket assembly;
a rear bracket assembly, wherein the rear bracket assembly is arranged in a manner of being opposite to the front bracket assembly;
a lower bracket assembly, wherein the lower bracket assembly comprises a first lower bracket unit and a second lower bracket unit; a first end of the first lower bracket unit is rotationally connected to a lower end of the front bracket assembly; a first end of the second lower bracket unit is rotationally connected to a lower end of the rear bracket assembly; a second end of the first lower bracket unit is rotationally connected to a second end of the second lower bracket unit;
a support frame assembly, wherein the support frame assembly is connected to the lower bracket assembly; the support frame assembly comprises several support rod and frame units; the support rod and frame units are rotationally connected to at least one adjacent support rod and frame unit; when the framework is in the unfolded state, a downwards sunken foot accommodating space is formed among at least some of the support rod and frame units, the first lower bracket unit, and the second lower bracket unit; and a cover body, wherein a first connector is arranged at an upper end of each of the front bracket assembly and the rear bracket assembly; an upper end of the cover body is connected to the first connectors; and a lower end of the cover body is connected to a lower end of the front bracket assembly and a lower end of the rear bracket assembly or the lower bracket assembly;

wherein a connecting strap is arranged at the upper end of the cover body; through holes are provided on the first connectors; and a free end of the connecting strap passes through the through holes and are connected to a surface of the cover body.

* * * * *